United States Patent
Wang

(10) Patent No.: US 8,938,160 B2
(45) Date of Patent: Jan. 20, 2015

(54) STABILIZING PLATFORM

(71) Applicant: SZ DJI Technology Co., Ltd, Shenzhen, Guangdong (CN)

(72) Inventor: Tao Wang, Shenzhen (CN)

(73) Assignee: SZ DJI Technology Co., Ltd, Shenzhen (CN)

( * ) Notice: Subject to any disclaimer, the term of this patent is extended or adjusted under 35 U.S.C. 154(b) by 0 days.

(21) Appl. No.: 14/045,606

(22) Filed: Oct. 3, 2013

(65) Prior Publication Data

US 2014/0037278 A1 Feb. 6, 2014

Related U.S. Application Data

(63) Continuation-in-part of application No. PCT/CN2011/082462, filed on Nov. 18, 2011, and a continuation-in-part of application No. PCT/CN2011/079704, filed on Sep. 15, 2011, and a continuation-in-part of application No. PCT/CN2011/079703, filed on Sep. 15, 2011.

(30) Foreign Application Priority Data

Sep. 9, 2011 (CN) .......................... 2011 1 0268339
Sep. 9, 2011 (CN) .......................... 2011 1 0268445

(51) Int. Cl.
*G03B 39/00* (2006.01)
*G03B 17/00* (2006.01)
*G02B 27/64* (2006.01)
*F16M 11/10* (2006.01)
(Continued)

(52) U.S. Cl.
CPC ............. *G02B 27/646* (2013.01); *F16M 11/10* (2013.01); *F16M 11/18* (2013.01); *F16M 11/2071* (2013.01); *B64C 39/024* (2013.01); *B64D 47/08* (2013.01); *F16M 2200/04* (2013.01); *B64C 2201/027* (2013.01); *B64C 2201/127* (2013.01)
USPC ................................................ 396/13; 396/55

(58) Field of Classification Search
USPC ........ 396/7, 12, 13, 50, 52, 55, 419, 421, 428
See application file for complete search history.

(56) References Cited

U.S. PATENT DOCUMENTS 3,564,134 A 2/1971 Rue et al.
4,490,724 A 12/1984 Bickman
(Continued)

FOREIGN PATENT DOCUMENTS

CN 101012906 A 8/2007
CN 101093733 A 12/2007
(Continued)

OTHER PUBLICATIONS

International search report and written opinion dated May 24, 2012 for PCT Application No. CN2011082462.
(Continued)

*Primary Examiner* — Clayton E Laballe
*Assistant Examiner* — Minh Phan
(74) *Attorney, Agent, or Firm* — Wilson Sonsini Goodrich & Rosati

(57) ABSTRACT

The present invention provides an apparatus and related methods for stabilizing a payload device such an imaging device. The methods and apparatus provide fast response time for posture adjustment of the payload device while reducing the energy used.

13 Claims, 23 Drawing Sheets

(51) Int. Cl.
*F16M 11/18* (2006.01)
*F16M 11/20* (2006.01)
*B64C 39/02* (2006.01)
*B64D 47/08* (2006.01)

(56) References Cited

U.S. PATENT DOCUMENTS

| | | | |
|---|---|---|---|
| 4,752,791 A | 6/1988 | Allred | |
| 5,426,476 A | 6/1995 | Fussell et al. | |
| 5,897,223 A * | 4/1999 | Tritchew et al. | 396/13 |
| 5,900,925 A | 5/1999 | Navarro | |
| 6,191,842 B1 | 2/2001 | Navarro | |
| 6,290,568 B1 | 9/2001 | Hou | |
| 6,584,382 B2 | 6/2003 | Karem | |
| 6,628,338 B1 * | 9/2003 | Elberbaum et al. | 348/373 |
| 7,000,883 B2 | 2/2006 | Mercadal et al. | |
| 7,190,097 B2 | 3/2007 | Voigt et al. | |
| 7,385,626 B2 | 6/2008 | Aggarwal et al. | |
| 7,905,463 B2 | 3/2011 | Burnham et al. | |
| 8,087,315 B2 | 1/2012 | Goossen et al. | |
| 8,140,200 B2 * | 3/2012 | Heppe et al. | 701/16 |
| 8,214,088 B2 | 7/2012 | Lefebure | |
| 8,473,125 B2 | 6/2013 | Rischmuller et al. | |
| 8,474,761 B2 | 7/2013 | Callou | |
| 8,498,447 B2 | 7/2013 | Derbanne | |
| 8,521,339 B2 | 8/2013 | Gariepy et al. | |
| 8,523,462 B2 | 9/2013 | Dimotakis | |
| 8,581,981 B2 | 11/2013 | Alley et al. | |
| 8,635,938 B2 | 1/2014 | King et al. | |
| 2002/0100850 A1 * | 8/2002 | Shental et al. | 248/276.1 |
| 2005/0185089 A1 | 8/2005 | Chapman | |
| 2009/0212157 A1 | 8/2009 | Arlton et al. | |
| 2010/0079101 A1 | 4/2010 | Sidman | |
| 2010/0250022 A1 | 9/2010 | Hines et al. | |
| 2011/0288696 A1 | 11/2011 | Lefebure | |
| 2011/0299732 A1 | 12/2011 | Jonchery et al. | |
| 2011/0301784 A1 | 12/2011 | Oakley et al. | |
| 2011/0311099 A1 | 12/2011 | Derbanne | |
| 2012/0050524 A1 | 3/2012 | Rinner et al. | |
| 2012/0105634 A1 | 5/2012 | Meidan et al. | |
| 2012/0287284 A1 | 11/2012 | Jacobsen et al. | |
| 2012/0307042 A1 | 12/2012 | Lee et al. | |
| 2013/0051778 A1 | 2/2013 | Dimotakis | |
| 2013/0162822 A1 | 6/2013 | Lee et al. | |
| 2013/0173088 A1 | 7/2013 | Callou et al. | |
| 2013/0176423 A1 | 7/2013 | Rischmuller et al. | |
| 2014/0008496 A1 | 1/2014 | Ye et al. | |

FOREIGN PATENT DOCUMENTS

| | | |
|---|---|---|
| CN | 201041611 Y | 3/2008 |
| CN | 101173826 A | 5/2008 |
| CN | 201287830 Y | 8/2009 |
| CN | 201380965 Y | 1/2010 |
| CN | 100590748 C | 2/2010 |
| CN | 101734377 A | 6/2010 |
| CN | 101811578 A | 8/2010 |
| CN | 201604802 U | 10/2010 |
| CN | 201626554 U | 11/2010 |
| CN | 101872198 A | 12/2010 |
| CN | 102043410 A | 5/2011 |
| CN | 101872198 B | 5/2012 |
| CN | 102556359 A | 7/2012 |
| DE | 10208413 A1 | 9/2003 |
| EP | 2356806 B1 | 5/2012 |
| FR | 2730570 A1 | 8/1996 |
| JP | 200318452 A | 1/2003 |
| JP | 2004242128 A | 8/2004 |
| JP | 200923379 A | 2/2009 |
| WO | WO 2007/033033 A2 | 3/2007 |
| WO | WO 2008/116982 A2 | 10/2008 |
| WO | WO 2009/109711 A2 | 9/2009 |
| WO | WO 2009/109711 A3 | 11/2009 |
| WO | WO 2010/031486 A1 | 3/2010 |
| WO | WO 2010/063916 A1 | 6/2010 |

OTHER PUBLICATIONS

International search report and written opinion dated Jun. 14, 2012 for PCT Application No. CN2011/079703.

International search report and written opinion dated Jun. 14, 2012 for PCT Application No. CN2011/079704.

Utility Model Patent Right Evaluation Report dated Aug. 24, 2013 for Patent No. ZL2011204761516 for Gyroscopic Dynamic Self-balancing PTZ.

Notice of allowance dated Sep. 11, 2014 for U.S. Appl. No. 14/179,078.

U.S. Appl. No. 14/179,078, filed Feb. 12, 2014, Wang et al.

Office action dated Apr. 8, 2014 for U.S. Appl. No. 14/179,078.

* cited by examiner

STABILIZING PLATFORM

CROSS-REFERENCE

This application is a continuation-in-part application of International Application No. PCT/CN2011/082462, filed on Nov. 18, 2011, which claims priority from China Patent Application No. 201110268339.6, filed on Sep. 9, 2011, and China Patent Application No. 201110268445.4, filed on Sep. 9, 2011. This application is also a continuation-in-part application of International Application No. PCT/CN2011/079703, filed on Sep. 15, 2011, which claims priority from China Patent Application No. 201110268445.4, filed on Sep. 9, 2011. This application is also a continuation-in-part application of International Application No. PCT/CN2011/079704, filed on Sep. 15, 2011, which claims priority from China Patent Application No. 201110268339.6, filed on Sep. 9, 2011. The content of each of the above applications is hereby incorporated by reference in its entirety.

BACKGROUND OF THE INVENTION

In the fields of videography, photography and/or surveillance, a carrier (e.g., an aircraft, vehicle, ship, robot or a human) is typically used for carrying a payload device such as an imaging device (e.g., video camera, camera) or the like. Such a carrier is typically subject to movement such as high-frequency vibration and/or low-frequency shake, causing similar movement of the payload device and affecting operation of the payload device. When the payload device is an imaging device, the movement of the carrier may translate to poor-quality images acquired by the imaging device.

To provide stability to the payload device, a stabilizing platform mounted on the carrier is typically used to carry the payload device. Such stabilization platforms may provide stability to the payload device by detecting posture changes in the payload device and reverse compensating the detected posture changes.

Traditionally, such reverse compensation has been provided by mechanical gear drives. However, such mechanical gear drives typically have a delayed response with a relatively long response time. As such, such mechanical gear drives can be inadequate for providing quick and dynamic adjustment of payload device postures, for example, to counteract the various posture changes of the carrier of the payload device. In particular, when the payload device is an imaging device, it may be difficult to provide high-quality images because of the delay.

SUMMARY OF THE INVENTION

There exists a considerable need for apparatus and method that can provide stability and rapid response to posture adjustments. The present invention addresses this need and provides related advantages as well.

Methods and apparatus for providing stability are provided herein. According to an aspect of the present invention, an apparatus is provided that comprises a frame assembly adapted to hold a device, a controller assembly comprising a measurement member configured to obtain state information with respect to at least a pitch, roll, and yaw axes of the device, the roll axis intersecting with the device, a controller configured to provide one or more motor signals based at least in part on posture information calculated from the state information; and a motor assembly configured to directly drive the frame assembly in response to the one or more motor signals so as to allow the device to rotate around at least one of the pitch, roll or yaw axes. The device can be configured to capture images. The measurement member can include one or more inertial sensors. The state information can include at least an angular velocity of the device. The frame assembly can comprise a first frame member configured to be coupled to the device, a second frame member rotatably coupled to the first frame member on the pitch axis of the device, and a third frame member rotatably coupled to the second frame member on the roll axis of the device. The motor assembly can comprise a first motor configured to directly drive the first frame member to rotate around the pitch axis in response to at least one of the one or more motor signals; and a second motor configured to directly drive the second frame member to rotate around the roll axis in response to at least one of the one or more motor signals.

In some embodiments, the frame assembly can further comprise a fourth frame member, the fourth frame member rotatably coupled to the third frame member on a yaw axis of the device; and the motor assembly further comprises a third motor configured to directly drive the third frame member to rotate around the yaw axis in response to at least one of the one or more motor signals.

In some embodiments, the center of gravity of (i) the device and (ii) the first frame member, can be located on the pitch axis. The center of gravity of (i) the device, (ii) the first frame member, and (iii) the second frame member, can be located on the roll axis. And the center of gravity of (i) the device, (ii) the first frame member, (iii) the second frame member, and (iv) the third frame member, can be located on the yaw axis.

According to another aspect of the present invention, an apparatus is provided that comprises a frame assembly adapted to hold an imaging device, the frame assembly comprising a first frame member configured to be coupled to the imaging device, a second frame member rotatably coupled to the first frame member on a pitch axis of the imaging device, and a third frame member rotatably coupled to the second frame member on a roll axis of the imaging device; a controller assembly comprising a measurement member configured to obtain state information with respect to at least the pitch, roll, and yaw axes of the imaging device and a controller configured to provide one or more motor signals based at least in part on posture information calculated from the state information; and a motor assembly configured to directly drive the frame assembly in response to the one or more motor signals so as to allow the imaging device to rotate around at least one of the pitch, roll or yaw axes.

In some embodiments, the roll axis can intersect with the imaging device. The motor assembly can comprise a first motor configured to directly drive the first frame member to rotate around the pitch axis in response to at least one of the one or more motor signals; and a second motor configured to directly drive the second frame member to rotate around the roll axis in response to at least one of the one or more motor signals. The frame assembly can further comprise a fourth frame member, the fourth frame member rotatably coupled to the third frame member on a yaw axis of the imaging device. The motor assembly can further comprise a third motor configured to directly drive the third frame member to rotate around the yaw axis in response to at least one of the one or more motor signals.

In some embodiments, a stator of the first motor can be affixed to the first frame member and a rotor of the first motor can be affixed to the second frame member, or the rotor of the first motor can be affixed to the first frame member and the stator of the first motor can be affixed to the second frame member. In some embodiments, a stator of the second motor can be affixed to the second frame member and a rotor of the second motor can be affixed to the third frame member, or the rotor of the second motor can be affixed to the second frame member and the stator of the second motor can be affixed to the third frame member.

According to another aspect of the present invention, an apparatus is provided that comprises a frame assembly adapted to hold a device; a controller assembly comprising an inertial measurement member configured to obtain state information comprising at least angular velocity and linear acceleration of the imaging device and a controller configured to provide one or more motor signals based at least in part on posture information calculated from the state information; and a motor assembly configured to directly drive the frame assembly in response to the one or more motor signals so as to allow the device to rotate around at least one of the pitch, roll or yaw axes.

In some embodiments, the frame assembly can comprise a first frame member configured to be coupled to the device; a second frame member rotatably coupled to the first frame member on a pitch axis of the device; and a third frame member rotatably coupled to the second frame member on a roll axis of the device that intersects with the device. The motor assembly can comprise a first motor configured to directly drive the first frame member to rotate around the pitch axis in response to at least one of the one or more motor signals; and a second motor configured to directly drive the second frame member to rotate around the roll axis in response to at least one of the one or more motor signals.

In some embodiments, the frame assembly can further comprise a fourth frame member, the fourth frame member rotatably coupled to the third frame member on a yaw axis of the device. The motor assembly can further comprise a third motor configured to directly drive the third frame member to rotate around the yaw axis in response to at least one of the one or more motor signals. The frame assembly can further comprise an adjustment member for adjusting at least one of the pitch, roll, or yaw axis relative to the frame assembly.

In some embodiments, a connecting assembly may can be further provided that connects a distal end of the second frame member and a distal end of the third frame member so as to support and stabilize the second frame member when the second frame member rotates relative to the third frame member. The connecting assembly can comprise a first connecting member, a second connecting member, and a third connecting member, which are sequentially and hingedly connected; a free end of the first connecting member is hingedly connected with a first distal end of the second frame member; a free end of the third connecting member is hingedly connected with a second distal end of the second frame member; and the second connecting member is connected with the third frame member. In some embodiments, the motor assembly can comprise a fourth motor configured to directly drive the second connecting member to rotate relative to the third frame member.

According to another aspect of the present invention, an unmanned aerial vehicle (UAV) is provided that comprises a base coupled to the apparatus discussed herein.

According to another aspect of the present invention, a method for controlling the apparatus discussed herein is provided. The method can comprise calculating, by the controller assembly, posture information based at least in part on the state information; providing, by the controller assembly, one or more motor signals to the motor assembly based at least in part on the calculated posture information; and in response to the one or more motor signals, driving, by the motor assembly, the frame assembly to rotate around at least one of the pitch, roll, or yaw axis.

According to another aspect of the present invention, a method for image acquisition is provided. The method can comprise remotely operating the unmanned aerial vehicle (UAV) to approach an object, the UAV being coupled to the apparatus discussed herein; and controlling the apparatus to stabilize a device held by the frame assembly of the apparatus so as to improve quality of images captured by the device.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION OF THE INVENTION

Figure 1:
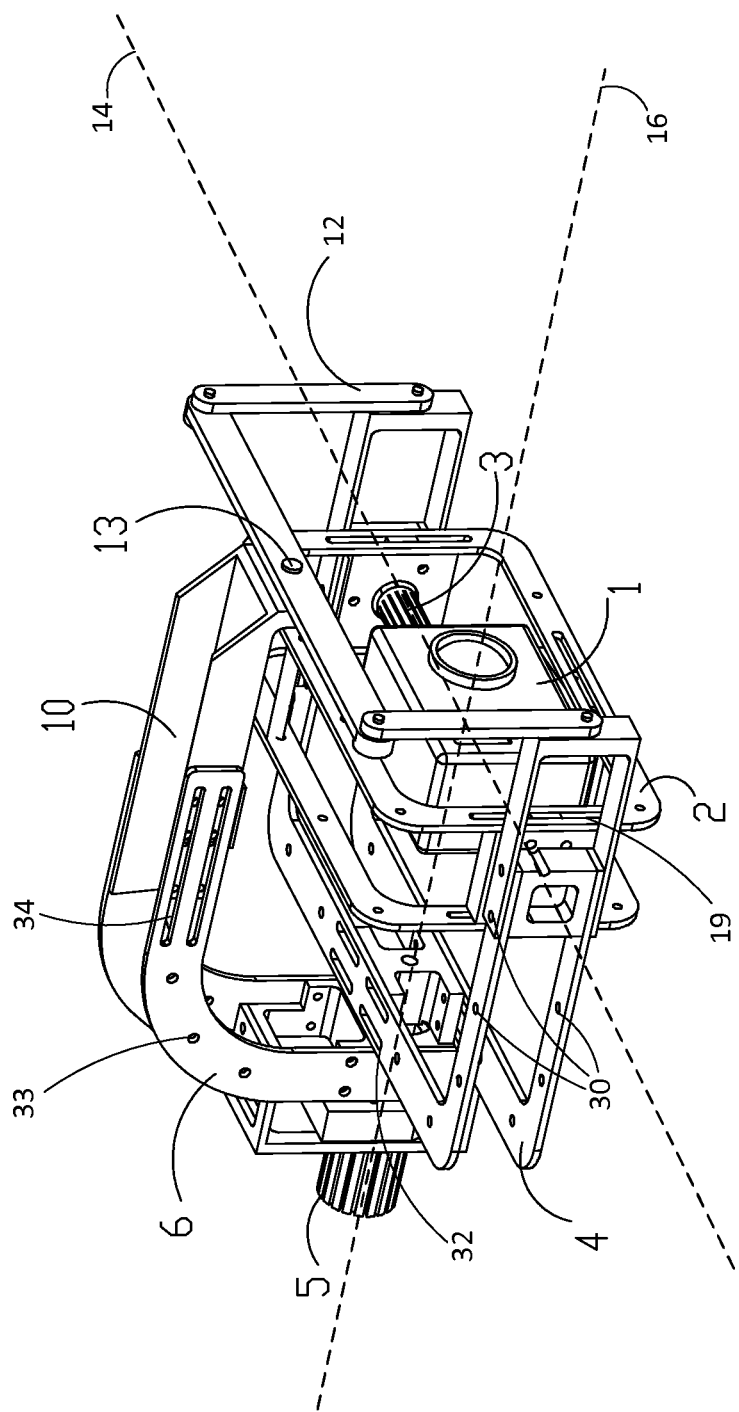
FIG. 1 illustrates a view of an assembled stabilizing platform with a payload device, in accordance with an embodiment of the present invention.

Methods and apparatus for a stabilizing a payload device are provided. In some embodiments, the payload devices may include imaging devices (including but not limited to video camera or camera) and non-imaging devices (including but not limited to microphone, sample collector). A stabilizing platform, such as a camera mount, may be provided for supporting and stabilizing the payload platform. The stabilizing platform may comprise a frame assembly adapted to hold the payload device, a controller assembly, and a motor assembly. The controller assembly may include a measurement member configured to detect or obtain state information associated with the payload device. The state information may include velocity, orientation, attitude, gravitational forces, acceleration, position, and/or any other physical state experienced by the payload device. For example, the state information may include an angular and/or linear velocity and/or acceleration, or an orientation or inclination of the payload device. In some embodiments, the measurement member may include an inertial measurement member comprising one or more gyroscopes, velocity sensors, accelerometers, magnetometers, and the like. In other embodiments, other types of state-detecting sensors may be used instead of or in addition to the inertial measurement member.

The controller assembly may also include a controller for calculating posture information associated with the payload device based on the state information obtained by the measurement member. For example, detected angular velocity and/or linear acceleration of the payload device may be used to calculate the attitude of the payload device with respect a pitch, roll and/or yaw axis of the payload device.

Based on the calculated posture of the payload device, one or more motor signals may be generated to control the motor assembly. The motor assembly may be configured to directly drive the frame assembly to rotate around at least one or a pitch, roll or yaw axis of the payload device so as to adjust the posture of the payload device (e.g., the shooting angle of an imaging device). The motor assembly can comprise one or more motors that are respectively coupled to one or more rotational axis (e.g., pitch, roll or yaw) of the payload device. In some embodiments, one or more of the rotational axes (e.g., pitch, roll and yaw) intersect with the payload device.

In some embodiments, the rotation order of the payload device is selected to allow the payload device to be rotated without the problem of "gimbal lock" under ordinary operational circumstances for the payload device, such as when pointing straight down. For example, in a preferred embodiment, the rotation order is pitch, roll and yaw from the innermost to outermost rotational axis.

In the present invention, the motor assembly is configured to directly drive the frame assembly, causing the payload device to rotate around rotational axis. Compared with the use of mechanical gear drive mechanisms, the use of direct-drive motors offers reduced energy consumption while allowing step-less control of the motor speed. Furthermore, using direct-drive motors, the response time is reduced between the posture change of the carrier and the corresponding compensating change to the stabilizing platform due to faster response time of the electric motors. Thus, the pointing direction of the payload device may be quickly adjusted (e.g., to point at a moving target). In some cases, a predetermined position or posture of the payload device may be maintained. Further, the payload device may be stabilized against unwanted movement such as vibrations or shakes caused by the carrier or other external factors. In cases where the payload device is an imaging device, the quality of images acquired by the payload device can be improved.

Exemplary Embodiment 1

FIG. 1 illustrates a structural schematic view of stabilizing platform, in accordance with an embodiment of the present invention. The stabilizing platform may be configured to hold a payload device 1 such as an imaging device or a non-imaging device (e.g., microphone, particle detector, sample collector). An imaging device may be configured to acquire and/or transmit one or more images of objects within the imaging device's field of view. Examples of an imaging device may include a camera, a video camera, cell phone with a camera, or any device having the ability to capture optical signals. A non-imaging device may include any other devices such as for collecting or distributing sound, particles, liquid, or the like. Examples of non-imaging devices may include a microphone, a loud speaker, a particle or radiation detector, a fire hose, and the like.

In some embodiments, the stabilizing platform may be adapted to be mounted or otherwise coupled to a movable object such as a motorized or non-motorized vehicle or vessel, robot, human, animal, or the like. For example, the stabilizing platform may be mounted to the base of a manned or unmanned aerial vehicle (UAV).

As illustrated by FIG. 1, a two-axis stabilizing platform is provided that provides two axes of rotation for a payload device 1 mounted therein. In particular, the payload device is allowed to rotate around the pitch (X) axis, and a roll (Y) axis 16. The stabilizing platform comprises a frame assembly, controller assembly and a motor assembly. The frame assembly includes a first frame member 2, a second frame member 4, and a third frame member 6. The first frame member 2 is adapted to be coupled to the payload device 1 such as an imaging device. In some embodiments, the payload device is affixed to the first frame member 2 such that the payload device and the first frame member are movable as a whole. The first frame member 2 is rotatably coupled to the second frame member 4 along a rotational (pitch) axis X 14. The second frame member 4 is rotatably coupled to the third frame member 6 on a rotational (roll) axis Y 16. In various embodiments, the shape, size and other characteristics of the payload device are not limited to those shown in FIG. 1. For example, the shape of the payload device may be rectangular, spherical, ellipsoidal, or the like.

In the illustrated embodiment, the motor assembly comprises a first motor 3 and a second motor 5. The first motor 3 is configured to directly drive the first frame member 2 to rotate around the X (pitch) axis 14 relative to the second frame member 4. The second motor 5 may be configured to directly drive the second frame member 4 to rotate around the Y (roll) axis 16. As discussed above, compared with mechanical driving means, direct-drive motors (e.g., compact motors or miniaturized motors) provide at least the following benefits: (1) direct-drive motors typically require relatively less energy, thereby promoting energy efficiency and environmental protection; (2) the motors may be controlled in a stepless fashion, reducing the response time, and enabling fast and timely adjustment in response to various posture changes of the carrier. Thus, the stability of the payload device (e.g., imaging device) is improved.

In some embodiments, additional support structure(s) may be optionally provided to further stabilize the platform. It is appreciated that such support structures are optional and thus not required in all embodiments of the present invention. As illustrated in FIG. 1, two free ends of the second frame member 4 extend outwardly while the first frame member 2 and the payload device 1 as a whole are rotatably disposed between the two free ends. When the second motor 5 drives the second frame member 4 into rotation, the longer the two free ends of the second frame member 4, the farther the center of gravity of the first frame member 2 and the payload device 1 may be located away from the pivot point of the second frame member 4, causing instability (e.g., shaking) of the second frame member 4 and hence the payload device 1 during rotation of the second frame member 4. In order to reduce or eliminate such instability of the second frame member 4, a connecting assembly 12, such as shown in FIG. 1, may be included to provide additional support. The two free ends of the connecting assembly 12 may be rotatably coupled to the two open ends of the second frame member 4 respectively, and the connecting assembly 12 may be coupled to the third frame member 6 via a fastener 13. In some embodiments, the free ends of the connecting assembly 12 are hingedly connected to the second frame member 4 to form a part of a parallelogram structure. According to the principles of parallelogram, when the second frame member 4 rotates at a certain angle relative to the third frame member 6, the connecting assembly 12 rotates a corresponding angle therewith without significantly affecting the rotation trajectory of the second frame member 4. In addition, the connecting assembly 12 is coupled to the third frame member 6 via the fastener 13, thereby providing effective support for the two open ends of the second frame member 4 along the vertical direction and increasing the load capacity and rigidity of the second frame member 4. Thus, any deformation of the second frame member 4, for example, caused by a heavy payload device, can be reduced. In addition, with the additional support provided by the connecting assembly 12, the size and/or weight of the second frame member 4 may be reduced. Correspondingly, the size (e.g., diameter) of the second motor 5 that is used to directly drive the second frame member 4 may be reduced.

Figure 2:
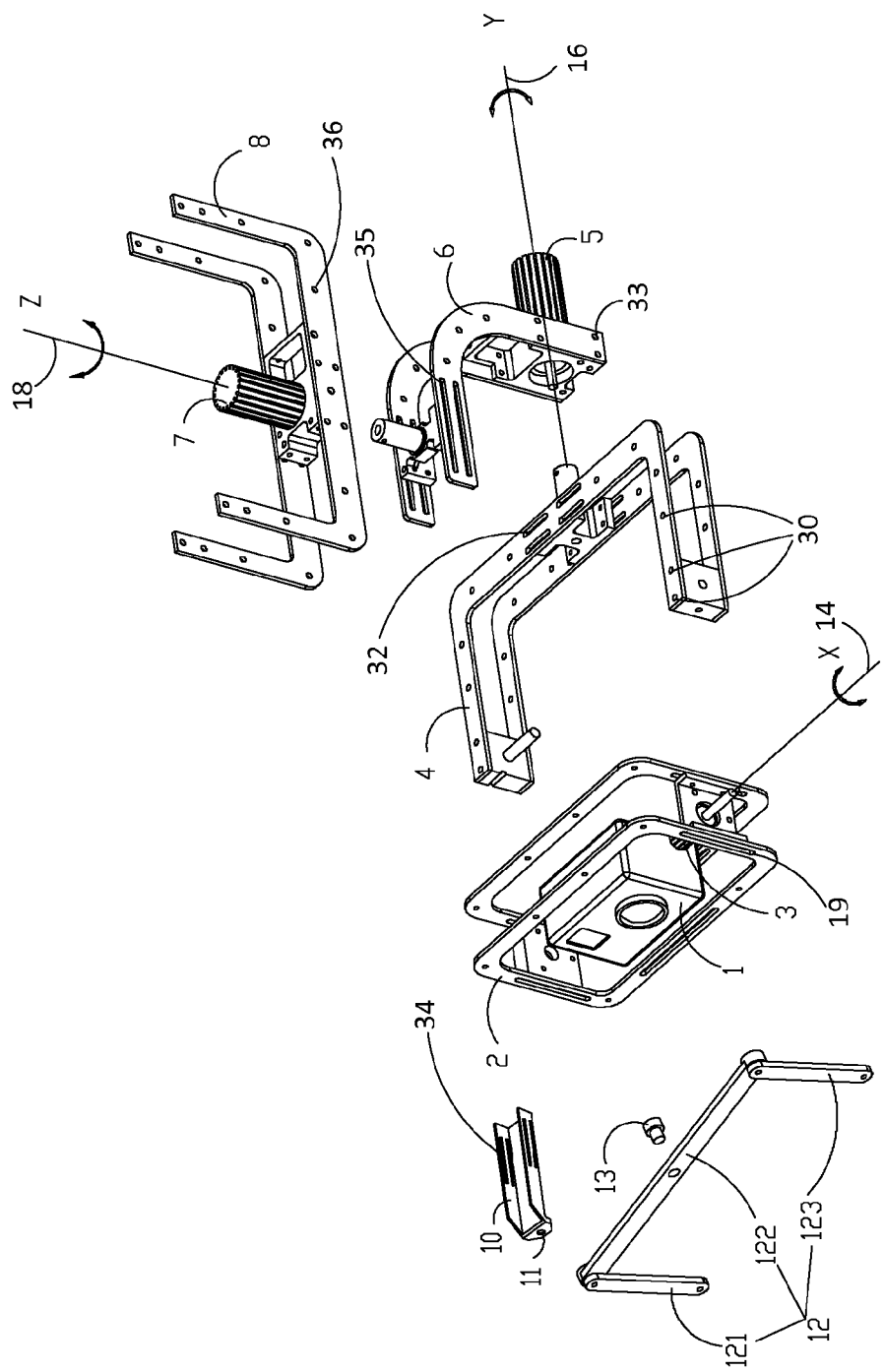
FIG. 2 illustrates an exploded view of a stabilizing platform with a payload device, in accordance with an embodiment of the present invention.
Figure 3:
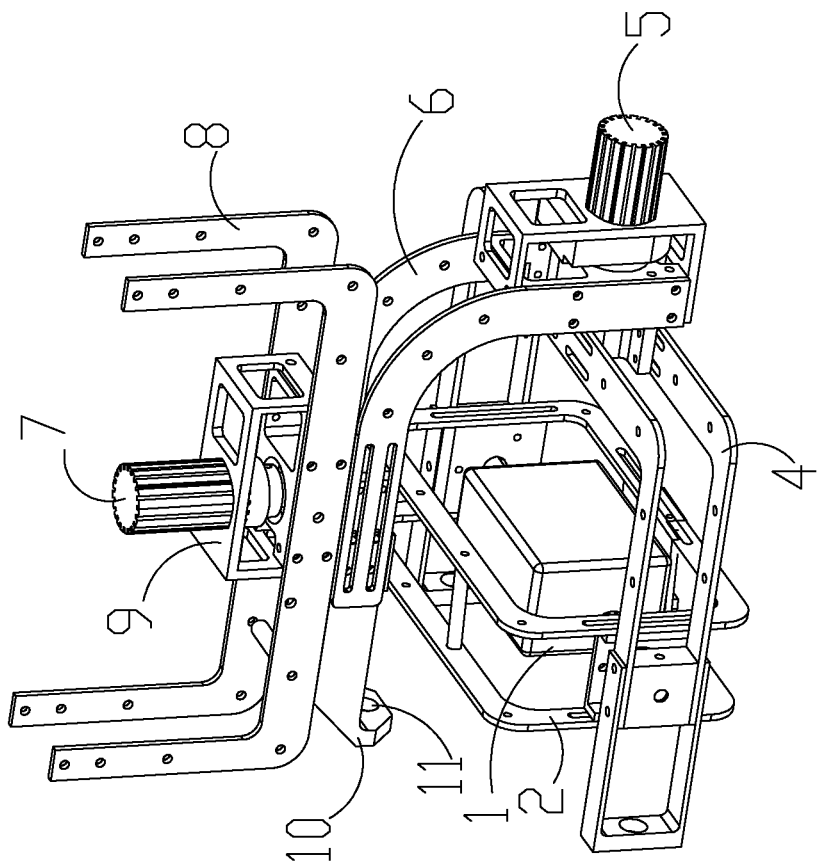
FIG. 3 illustrates an exploded view of a stabilizing platform with a payload device, in accordance with an embodiment of the present invention.
Figure 3:
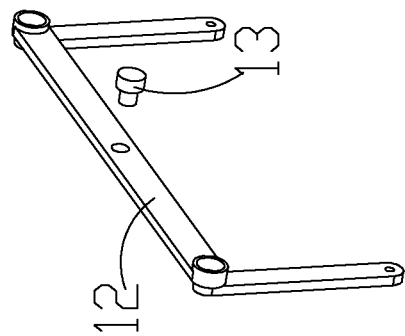
Figure 4:
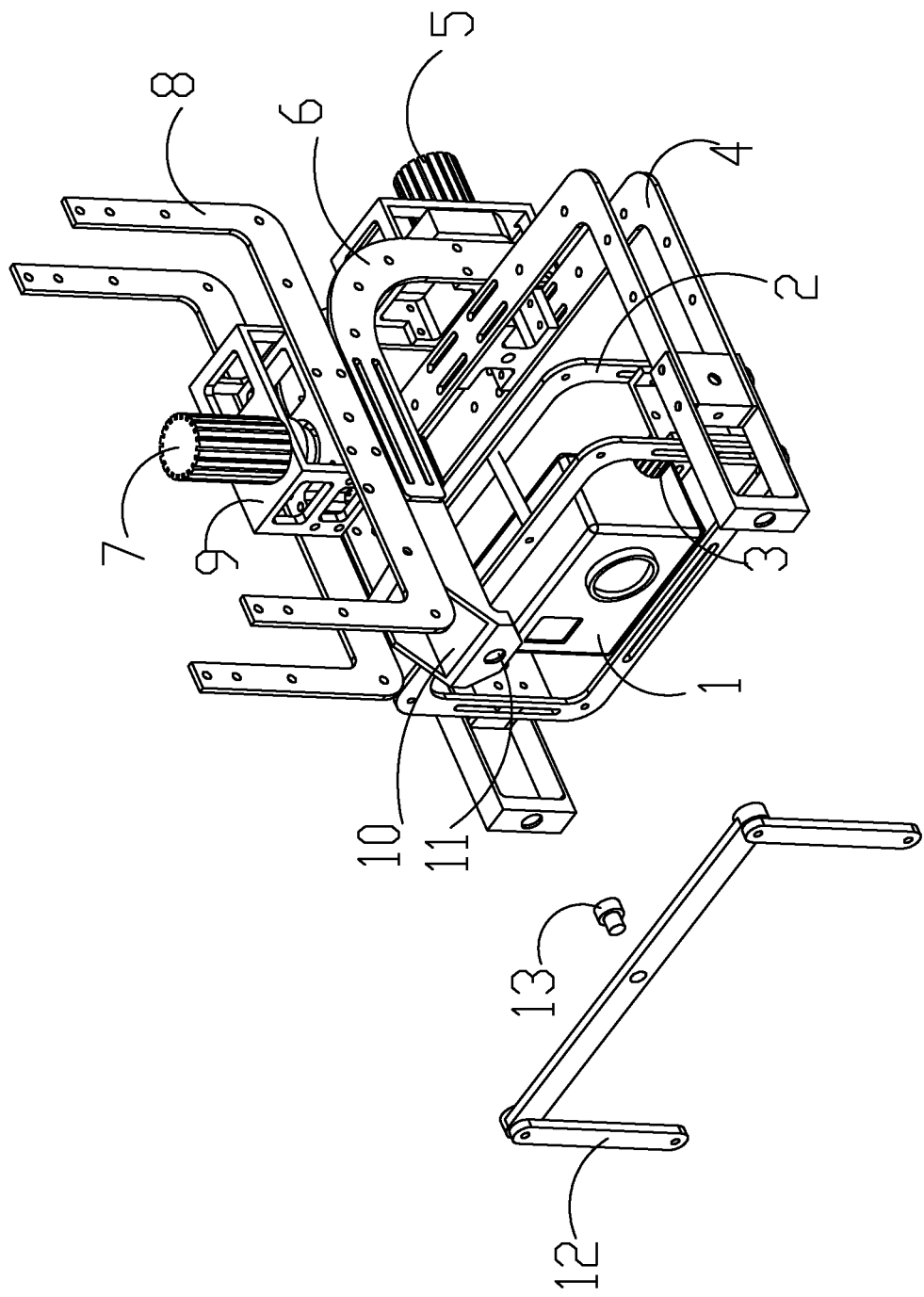
FIG. 4 illustrates an exploded view of a stabilizing platform with a payload device, in accordance with an embodiment of the present invention.
Figure 5:
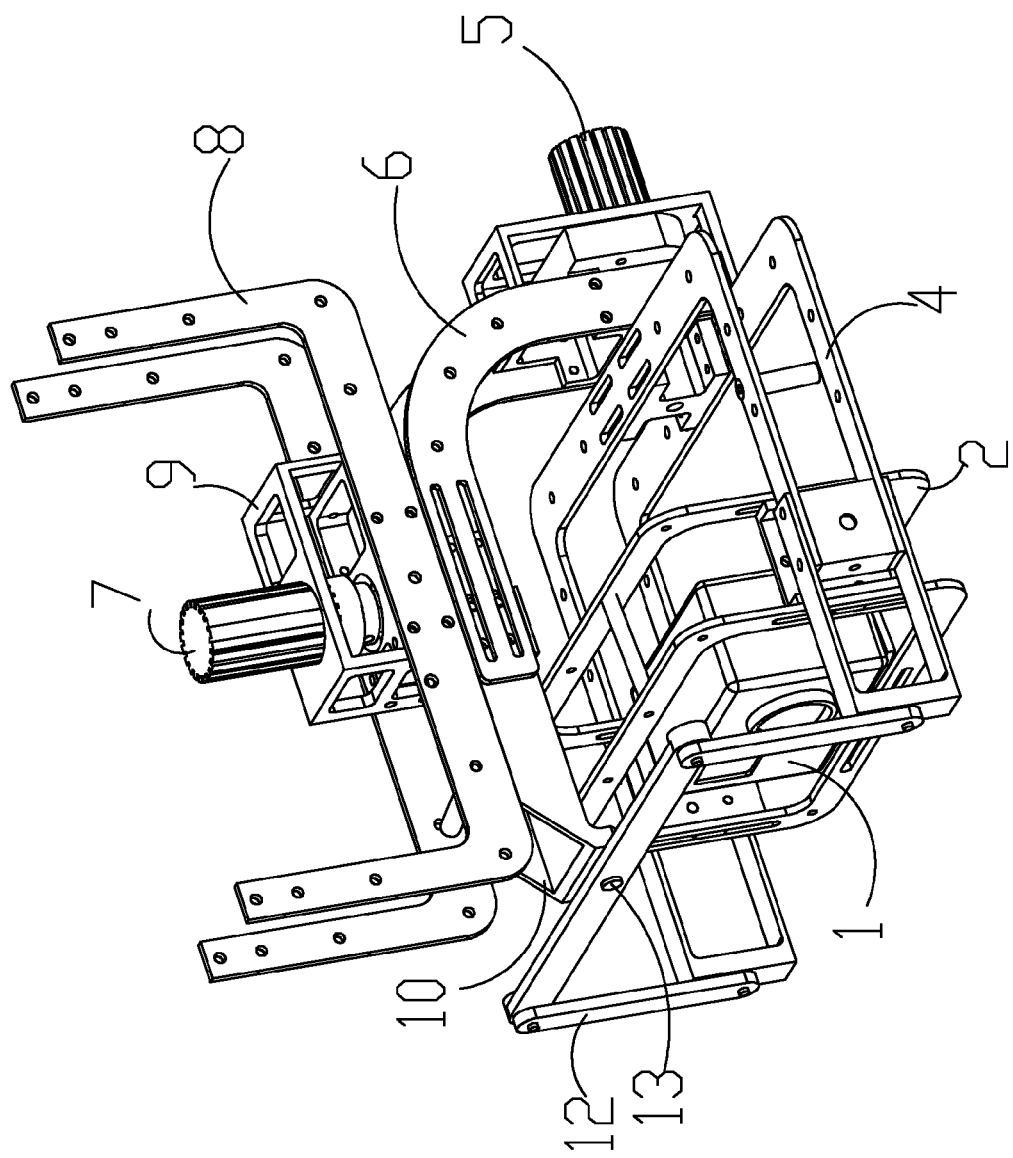
FIG. 5 illustrates a view of an assembled stabilizing platform with a payload device, in accordance with an embodiment of the present invention.
Figure 6:
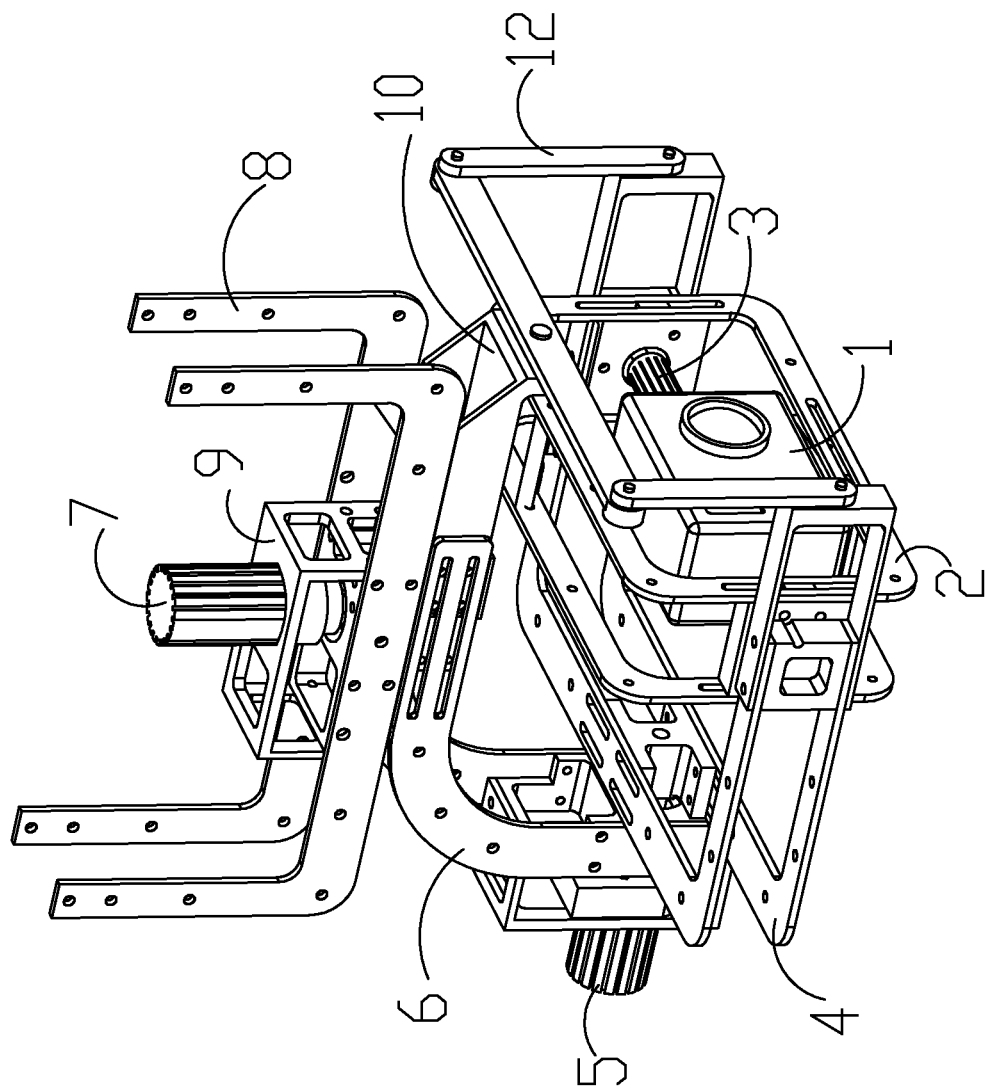
FIG. 6 illustrates a view of an assembled stabilizing platform with a payload device, in accordance with an embodiment of the present invention.

In some embodiments such as shown in FIG. 2, the connecting assembly 12 comprises a first connecting member 121, a second connecting member 122 and a third connecting member 123 that are sequentially and hingedly connected. A free end of the first connecting member 121 is hingedly connected with a first distal end of the second frame member 4, the free end of the third connecting member 123 is hingedly connected with a second distal end of the second frame member 4, and the second connecting member 122 is coupled to the third frame member 6 so that the connecting assembly 12 and the second frame member 4 jointly form a portion of a parallelogram. In order to enhance the stability of the parallelogram, the second connecting member 122 is preferably coupled to the third frame member 6 (e.g., via the fastener 13) at the midpoint of the second connecting member 122.

In some embodiments, a mounting arm 10 is provided, such as shown in FIG. 1, to connect the connecting member 12 with the third frame member 6. As illustrated, one end of the mounting arm 10 is coupled to the third frame member 6 and the other end of mounting arm 10 is provided with a positioning hole 11 adapted to be coupled with the fastener 13. The second connecting member 122 is fastened to the mounting arm 10 via the fastener 13.

In a preferred embodiment, the rotational (pitch) axis X 14 of the first frame member 2 is orthogonally disposed relative to the rotational axis Y 16 of the second frame member 4, for example, to allow the motors to easily and timely adjust the rotation of the frame assembly. In other embodiments, the rotational axes may not be orthogonally disposed to each other.

In some embodiments, a stator of the first motor 3 is affixed to the first frame member 2 and a rotor of the first motor 3 is affixed to the second frame member 4. In such embodiments, the first motor 3 may be configured to directly drive the second frame member 4, thereby causing the first frame member 2 to rotate relative to the second frame member 4. Similarly, in some embodiments, the stator of the second motor 5 is affixed to the third frame member 6 and the rotor of the second motor 5 is affixed to the second frame member 4. In such embodiments, the second motor 5 may be configured to directly drive the second frame member 4, thereby causing the second frame member 4 to rotate relative to the third frame member 6. It is appreciated that the positions of the stator and the rotor of the first motor 3 may be interchangeable. Likewise, the positions of the stator and the rotor of the second motor 3 may be interchangeable.

To further increase the stability for the payload device, the center of gravity of the first frame member 2 and the payload device 1 as a whole is preferably located on the rotational (pitch) axis X 14 of the first frame member 2. In some embodiments, the pitch axis intersects with the payload device 1. It is appreciated that when the center of gravity of the first frame member 2 and the payload device 1 is positioned on the rotational axis X 14 of the first frame member 2, the rotation of the first frame member 2 does not generate any torque. In other words, the first frame member 2 is not likely to be any swing movement caused by the torque. Thus, the stability of the payload device is enhanced during rotation. In addition, in the preferred embodiment, when the carrier is moving smoothly, that is, when little or no motor drive stabilization is required, the first frame member 2 and the payload device 1 is also in a dynamically balanced state.

Similarly, to provide enhanced stability and avoid torque generated by rotation around the rotational Y (roll) axis 16, in a preferred embodiment and as shown in FIG. 1, the center of gravity of the first frame member 2, the second frame member 4 and the payload device 1 as a whole is located on the rotational axis Y 16 of the second frame member 6. In some embodiments, the rotational Y (roll) axis 16 intersects with the payload device 1.

In some embodiments, the frame assembly may comprise one or more adjustment members for adjusting the dimensions or rotational axes of the frame assembly. Such adjustment members may allow the frame assembly to accommodate payload devices of different dimensions, shapes and/or weight. In addition, the adjustment may be necessary, for example, to align the center of gravity with a rotational axis as discussed above, such as to position the center of gravity of the payload device and the first frame member 2 as a whole on the pitch (X) axis 14, and/or to position the center of gravity of the payload device, the first frame member 2 and the second frame member 4 as a whole on the roll axis 16. For example, as illustrated in FIG. 1, the first frame member 2 can include one or more adjustment members 19 (e.g., slits, holes) for adjusting the position of the payload device 1 and/or the first motor 3 relative to the first frame member 2. Such adjustment may be required, for example, to align the center of gravity of the payload device 1 and the first frame member 2 as a whole on the rotational axis 14 of the first motor 3. As another example, the second frame member 4 can include one or more adjustment members 30 of FIG. 1 for adjusting the position of the first frame member 2 relative to the second frame member 4. For example, the first frame member 2 can be positioned further from or closer to the pivot point of the second frame member 4 depending on the size or shape of the payload device 1. As another example, the second frame member 4 can include one or more adjustment members 32 for adjusting the position of the second motor 5 relative to the second frame member 4. Such adjustment may be required, for example, to align the center of gravity of the payload device 1, the first frame member 2, and the second frame member 4 as a whole on the rotational axis 16 of the second motor 5. The third frame member 6 can also include one or more adjust members 33 for changing the position of the second frame member 4 relative to the third frame member 6. The third frame member 6 may also include one or more adjustment members 34 for changing the dimensions of the third frame member 4 so as to accommodate payload devices of various sizes.

In a preferred embodiment, at least one of the first motor 3 or the second motor 5 is implemented using a brushless DC electric motor. The brushless DC motors have the following benefits: (1) reliable performance, reduced wear and/or malfunction rate, and a longer service life (about six times) than that of a brushed motor due to commutation with electronics instead of mechanical commutators (2) low no-load current because brushless DC motors are static motors; (3) high efficiency; and (4) small size. In various embodiments, other types of motors may be used instead of or in addition to brushless DC motors.

In some embodiments, the controller assembly comprises a controller and a measurement member. The measurement member may be configured to measure or obtain state information associated with the payload device, and/or with objects other than the payload device, such as the frame assembly, the motors, the carrier, and the like. The measurement member may include an inertial measurement unit, a compass, a GPS transceiver, or other types of measurement components or sensors. For example, the measurement member may include one or more gyroscopes for detecting angular velocity and one or more accelerometer for detecting linear and/or angular acceleration of an object (e.g., payload device, frame assembly, and/or carrier). The state information may include angular and/or linear velocity and/or acceleration of the object, positional information, and the like. Such state information may be relative or absolute. In some embodiments, the measurement member may be configured to measure state information with respect to more than one rotational axis of the object. In some embodiments, the measurement member may obtain information that relate to at least two of the rotational axes. For example, the measurement member may obtain information related to both the pitch and roll axes of the object. Or, the state information may pertain to all of the pitch, roll and yaw axes of the object. In various embodiments, the measurement member may be coupled to the payload device 1, the frame assembly, the motor assembly, the carrier, or the like.

In some embodiments, the controller may be configured to calculate posture information of the object based on the state information detected by the measurement member and to provide one or more motor signals based on the posture information. Such posture information may include the pitch, roll, yaw axes of the object, orientation or inclination of the object with respect to the axes, velocity and/or acceleration, and the like. In some cases, the posture information may be calculated based on angular velocity information (e.g., as provided by the measurement member or from other sources). In other cases, the posture information may be calculated based on both angular velocity information and linear acceleration information. For example, the linear acceleration information may be used to modify and/or correct the angular velocity information.

Based on the posture information, one or more motor signals may be generated to cause forward rotation, reverse rotation of the motors (e.g., first motor 3 and second motor 5), and to adjust the speed of the rotations. In response to the one or more motor signals, the motors (e.g., first motor 3 and second motor 5) can directly drive their respective portions of the frame assembly to rotate in response to the one or more motor signals. As a result, the payload device is allowed to rotate around at least one of the pitch or roll axes. Such rotation may be necessary for stabilizing the payload device and/or for maintaining a predetermined position or posture.

Exemplary Embodiment 2

FIGS. 2-6 illustrate example views of a stabilizing platform, in accordance with a second embodiment of the present invention. The platform illustrated in this embodiment is similar to that illustrated in the first embodiment as discussed in connection with FIG. 1. In some embodiments, the stabilizing platform may be adapted to be mounted or otherwise coupled to a movable object such as a motorized or non-motorized vehicle or vessel, robot, human, animal, or the like. For example, the stabilizing platform may be mounted to the base of a manned or unmanned aerial vehicle (UAV).

However, as illustrated by FIGS. 2-6, the stabilizing platform in the second embodiment provides three axes of rotation for a payload device mounted therein, instead of the two axes of rotation provided by the stabilizing platform in the first embodiment. More specifically, as shown in FIG. 2, the payload device is allowed to rotate around the pitch (X) axis 14, roll (Y) axis 16, and yaw (Z) axis 18. The three-axis stabilizing platform comprises a frame assembly adapted to support a payload device 1 (e.g., imaging device such as a camera), a motor assembly, a controller assembly.

As illustrated by FIG. 2, the frame assembly comprises a first frame member 2, a second frame member 4, a third frame member 6 and a fourth frame member 8. The first, second and third frame members may be similar to those described in connection with FIG. 1. In particular, the first frame member 2 is adapted to be coupled to the payload device 1 such as an imaging device. In some embodiments, the payload device is affixed to the first frame member 2 such that the payload device and the first frame member are movable as a whole. The second frame member 4 is rotatably coupled to the first frame member 2 around a rotational (pitch) axis X 14, so that the first frame member 2 and hence the payload device 1 may tilt upward or downward. The second frame member 4 is rotatably coupled to the third frame member 6 on a rotational (roll) axis Y 16, so that the second frame member 4 can rotate around the roll axis 16 relative to the third frame member 6, causing the first frame and the payload device as a whole to rotate around the roll axis 16. Thus, when the carrier rolls to the left or to the right, the payload device can be made to roll to the right or to the left in order to maintain stability (e.g., a predetermined posture). The third frame member 6 is rotatably coupled to the fourth frame member 8 on a rotational Z (yaw) axis 18, allowing the payload device 1 to circumferentially rotate (e.g., up to 360 degrees), for example, in order to perform panoramic photography. In some embodiments, the fourth frame member 8 may be used to mount the stabilizing platform to or to facilitate the carrying of the stabilizing platform by a carrier such as a aerial vehicle, motor vehicle, ship, robot, human, or any other movable object. As another example, the stabilizing platform may be handheld by a human, for example, to perform dynamic videography or photography.

In the illustrated embodiment, the motor assembly comprises a first motor 3, a second motor 5 and a third motor 7. The first motor 3 is configured to directly drive the first frame member 2 to rotate around the X (pitch) axis 14 relative to the second frame member 4. The second motor 5 may be configured to directly drive the second frame member 4 to rotate around the Y (roll) axis 16. The third motor 7 may be configured to directly drive the third frame member 6 to rotate around the yaw (Z) axis 18. The advantages of using direct-drive motors are discussed above in connection with FIG. 1.

Also as discussed in connection with FIG. 1, additional structure(s) may be optionally included to provide additional support or stabilization. For example, a connecting assembly 12 similar to that described in FIG. 1 or a similar structure may be provided to reinforce or stabilize the second frame member 4, for example, when it rotates relative to the third frame member 6.

Advantageously, the rotation order of pitch, roll and yaw (from the innermost to outermost rotational axis) is selected to allow the payload device to be rotated without the problem of "gimbal lock" under ordinary operational circumstances for the payload device, such as when pointing straight down.

In a preferred embodiment, the rotational (pitch) axis X 14 of the first frame member 2, rotational (roll) axis Y 16 of the second frame member 4, and the rotational (yaw) axis Z 18 of the third frame member 8 are orthogonally disposed to each other. Such an arrangement may allow the motors to easily and timely adjust the rotation angles of the frame assembly. In other embodiments, the rotational axes may not be orthogonally disposed to each other.

As discussed in connection with FIG. 1, in some embodiments, a stator of the first motor 3 is affixed to the first frame member 2 and a rotor of the first motor 3 is affixed to the second frame member 4. In such embodiments, the first motor 3 may be configured to directly drive the second frame member 4, thereby causing the first frame member 2 to rotate relative to the second frame member 4. Similarly, in some embodiments, the stator of the second motor 5 is affixed to the third frame member 6 and the rotor of the second motor 5 is affixed to the second frame member 4. In such embodiments, the second motor 5 may be configured to directly drive the second frame member 4 to rotate relative to the third frame member 6. Similarly, in some embodiments, the stator of the third motor 7 is affixed to the fourth frame member 8 and the rotor of the third motor 7 is affixed to the third frame member 6. In such embodiments, the third motor 7 may be configured to directly drive the third frame member 6 rotate relative to the fourth frame member 8. The third motor 7 may be coupled to the fourth frame member 8 via a bracket 9. It is appreciated that the positions of the stator and the rotor may be interchangeable for the first motor 3, the second motor 5 and the third motor 7.

As discussed in connection with FIG. 1, to increase the stability of the platform, the center of gravity of the first frame member 2 and the payload device 1 as a whole is preferably located on the rotational (pitch) axis X 14 of the first frame member 2. In some embodiments, the pitch axis intersects with the payload device 1. Similarly, the center of gravity of the first frame member 2, the second frame member 4, and the payload device 1 as a whole is preferably located on the rotational (roll) axis Y 16 of the second frame member 4. In some embodiments, the rotational (roll) axis Y 16 intersects with the payload device 1. Likewise, the center of gravity of the first frame member 2, the second frame member 4, the third frame member 6, and the payload device 1 as a whole is preferably located on the rotational (yaw) axis Z 18 of the third frame member 6. In some embodiments, the rotational (yaw) axis Z 18 intersects with the payload device 1.

As discussed in connection with FIG. 1, in some embodiments, the frame assembly may comprise one or more adjustment members for adjusting the dimensions or rotational axes of the frame assembly. Such adjustment may allow the frame assembly to accommodate payload devices of different dimensions, shapes or weights. In addition, the adjustment may be necessary, for example, to align a center of gravity and a rotational axis such as discussed above. For example, as illustrated in FIG. 2, the first frame member 2 can include one or more adjustment members 19 (e.g., slits, holes) for adjusting the position of the payload device 1 and/or the first motor 3 relative to the first frame member 2. Such adjustment may be required, for example, to align the center of gravity of the payload device 1 and the first frame member 2 as a whole on the rotational axis 14 of the first motor 3. As another example, the second frame member 4 can include one or more adjustment members 30 for adjusting the position of the first frame member 2 relative to the second frame member 4. For example, the first frame member 2 can be positioned further from or closer to the pivot point of the second frame member 4 depending on the size or shape of the payload device 1. As another example, the second frame member 4 can include one or more adjustment members 32 for adjusting the position of the second motor 5 relative to the second frame member 4. Such adjustment may be required, for example, to align the center of gravity of the payload device 1, the first frame member 2, and the second frame member 4 as a whole on the rotational axis 16 of the second motor 5. The third frame member 6 can also include one or more adjust members 33 for changing the position of the second frame member 4 relative to the third frame member 6. The third frame member 6 may also include one or more adjustment members 34 for changing the dimensions of the third frame member 4 so as to accommodate payload devices of various sizes. Furthermore, the third frame member 6 may include one or more adjustment members 35 for adjusting the position of the third motor 7 and/or the fourth frame member 8 relative to the third frame member 6. Likewise, the fourth frame member 8 may include one or more adjustment members 36 for adjusting the position of the third frame member 6 and/or the third motor 7 relative to the fourth frame member 8.

In preferred embodiments, at least one of the first motor 3, the second motor 5 or the third motor 7 is implemented using a brushless DC electric motor. As discussed above in connection with FIG. 1, brushless DC motors are preferred because they provide or enable reliable performance, reduced wear and malfunction rate, a longer service life, low no-load current, high efficiency, and reduced size. In various embodiments, other types of motors may be used instead of or in addition to brushless DC motors.

In some embodiments, the controller assembly may be similar to that described in connection with FIG. 1. In particular, the controller assembly may comprise a controller and a measurement member. The measurement member may be configured to measure state information associated with an object (e.g., payload device, frame assembly, and/or carrier). The state information may be related to more than one rotational axis of the object (e.g., pitch, roll and yaw). In some embodiments, the controller may be configured to calculate posture information of the object based on the state information detected by the measurement member and to provide one or more motor signals based on the posture information. Such posture information may include the pitch, roll, yaw axes of the object, orientation or inclination of the object with respect to the axes, velocity and/or acceleration, and the like. The posture information may be calculated based on angular and/or linear velocity and/or acceleration information (e.g., as provided by the measurement member or from other sources).

Based on the posture information, one or more motor signals may be generated to cause forward rotation, reverse rotation of the motors (e.g., first motor 3, second motor 5, and third motor 7), and to adjust the speed of the rotations. In response to the one or more motor signals, the motors (e.g., first motor 3, second motor 5, and third motor 7) can directly drive their respective portions of the frame assembly to rotate in response to the one or more motor signals. As a result, the payload device is allowed to rotate around at least one of the pitch, roll or yaw axes, for example, to maintain a stabilized position or posture.

Exemplary Embodiment 3

FIGS. 12-15 illustrate examples of a third embodiment of the present invention. The third embodiment may be similar to the first embodiment and the second embodiment, except that the fastener 13 is replaced with a fourth motor 25 which directly drives the connecting assembly 12 to rotate relative to the third frame member 6. Thus, the connecting assembly 12 brings the second frame member 4 to rotate therewith. Hence, the fourth motor may be auxiliary to the second motor 5. It may be appreciated that, in some embodiments, the fourth motor may replace the second motor 5 and serve as a motive power source by which the second frame member 4 rotates relative to the third frame member 6. In such embodiments, the second motor 5 may be optional and the motor assembly may only include the first motor 3, the third motor 7 and the fourth motor.

Figure 7:
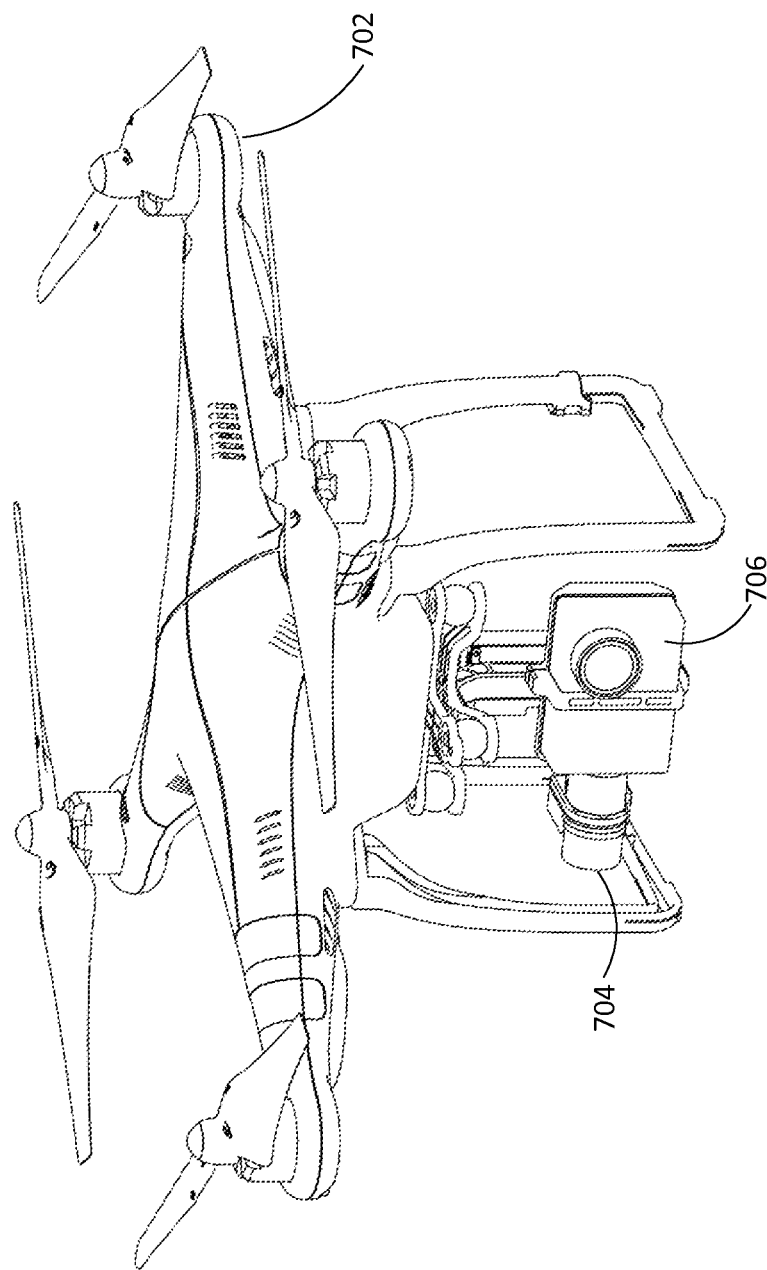
FIG. 7 illustrates a view of an unmanned aerial vehicle carrying a stabilizing platform with a payload device, in accordance with an embodiment of the present invention.
Figure 8:
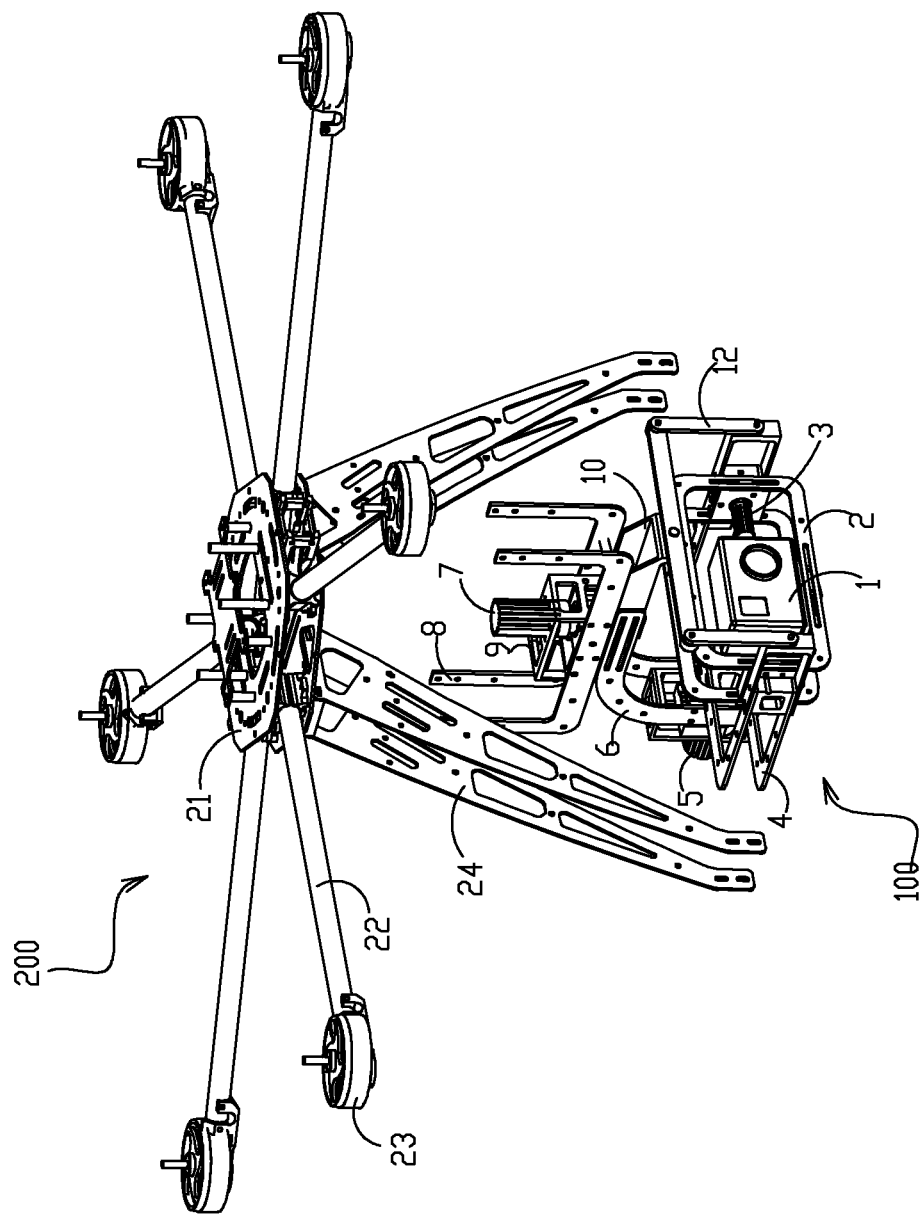
FIG. 8 illustrates an exploded view of an exemplary unmanned multi-rotor aircraft carrying a stabilizing platform with a payload device, in accordance with an embodiment of the present invention. The platform includes a three-axis stabilizing platform such as the one described in the exemplary embodiment 2. The exemplary unmanned multi-rotor aircraft of FIG. 8 includes a multi-rotor mount 200 and circuit components. The multi-rotor mount 200 include a base 21, at least three support arms 22 connected to the base 21, rotor members 23 coupled to the distal ends of the support arms 22, and multiple support frames 24 used for positioning that extend outward from the base 21. It is appreciated that the number of support arms 22 is not limited to three but can be four, six eight or any suitable number. The support arms 22 can be connected to the base 21 via a plugging mechanism, welding, screws, riveting, and the like. The three-axis stabilizing platform 100 can be coupled to the base 21 via the mounting frame member 8.
Figure 9:
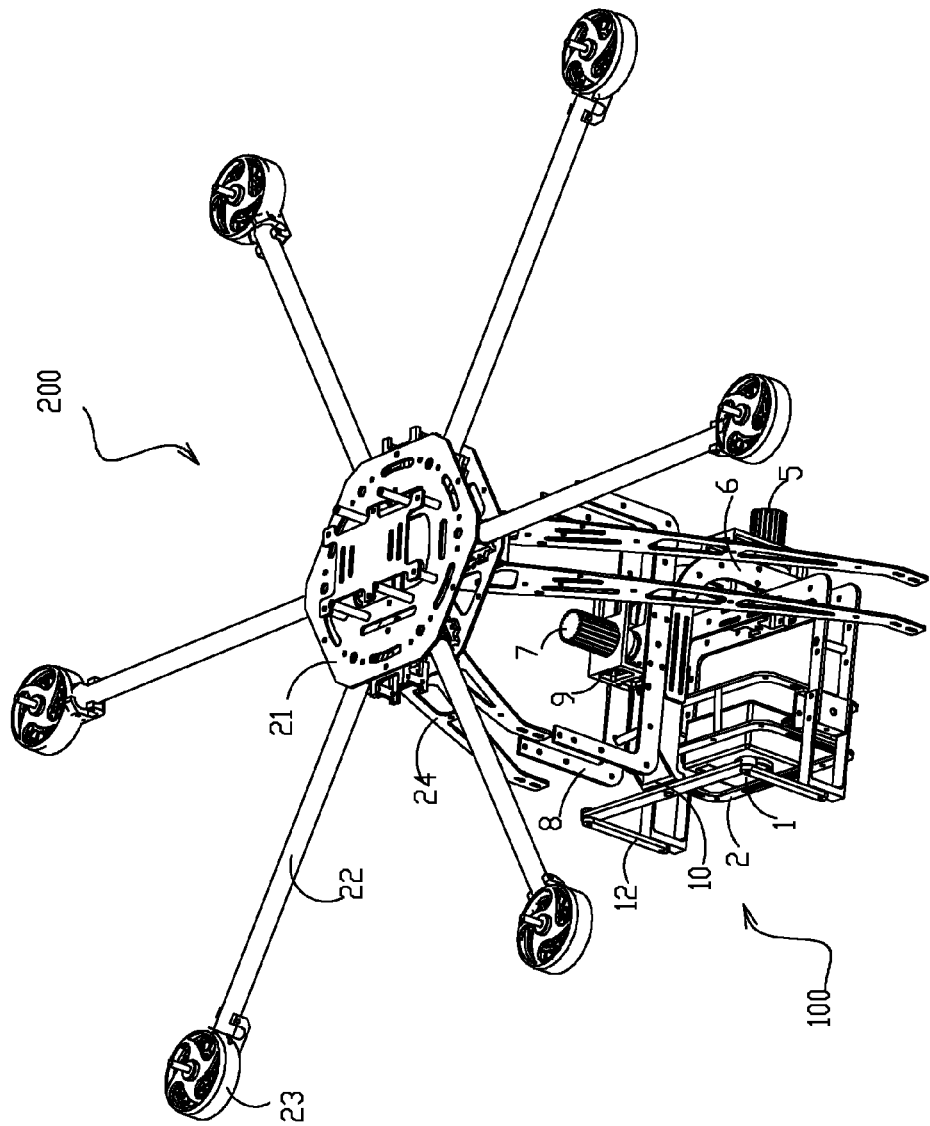
FIG. 9 illustrates another exploded view of the unmanned multi-rotor aircraft of FIG. 8 carrying a stabilizing platform with a payload device, in accordance with an embodiment of the present invention.
Figure 10:
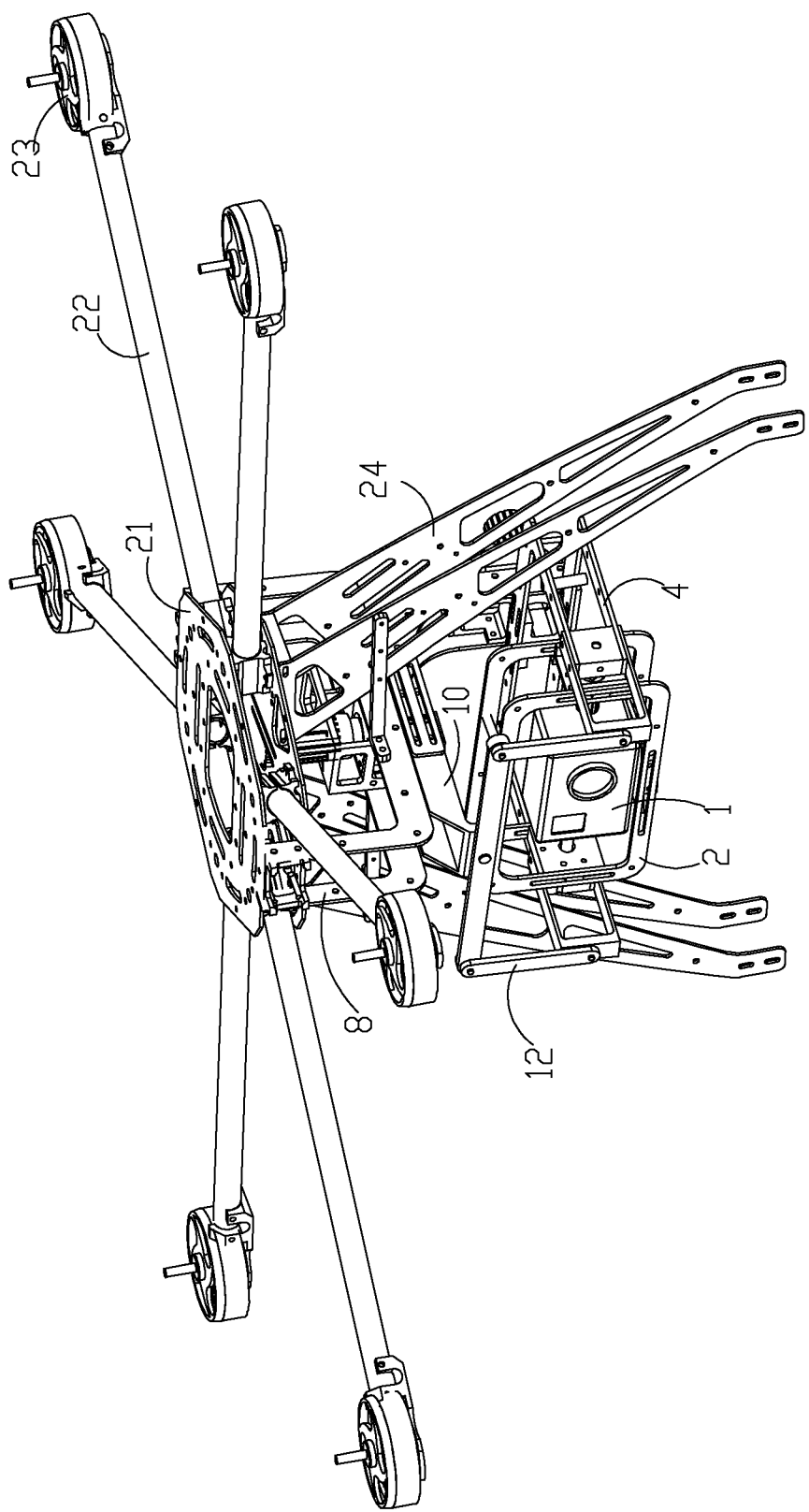
FIG. 10 illustrates another view of the assembled unmanned multi-rotor aircraft of FIG. 8 carrying a stabilizing platform with a payload device, in accordance with an embodiment of the present invention.
Figure 11:
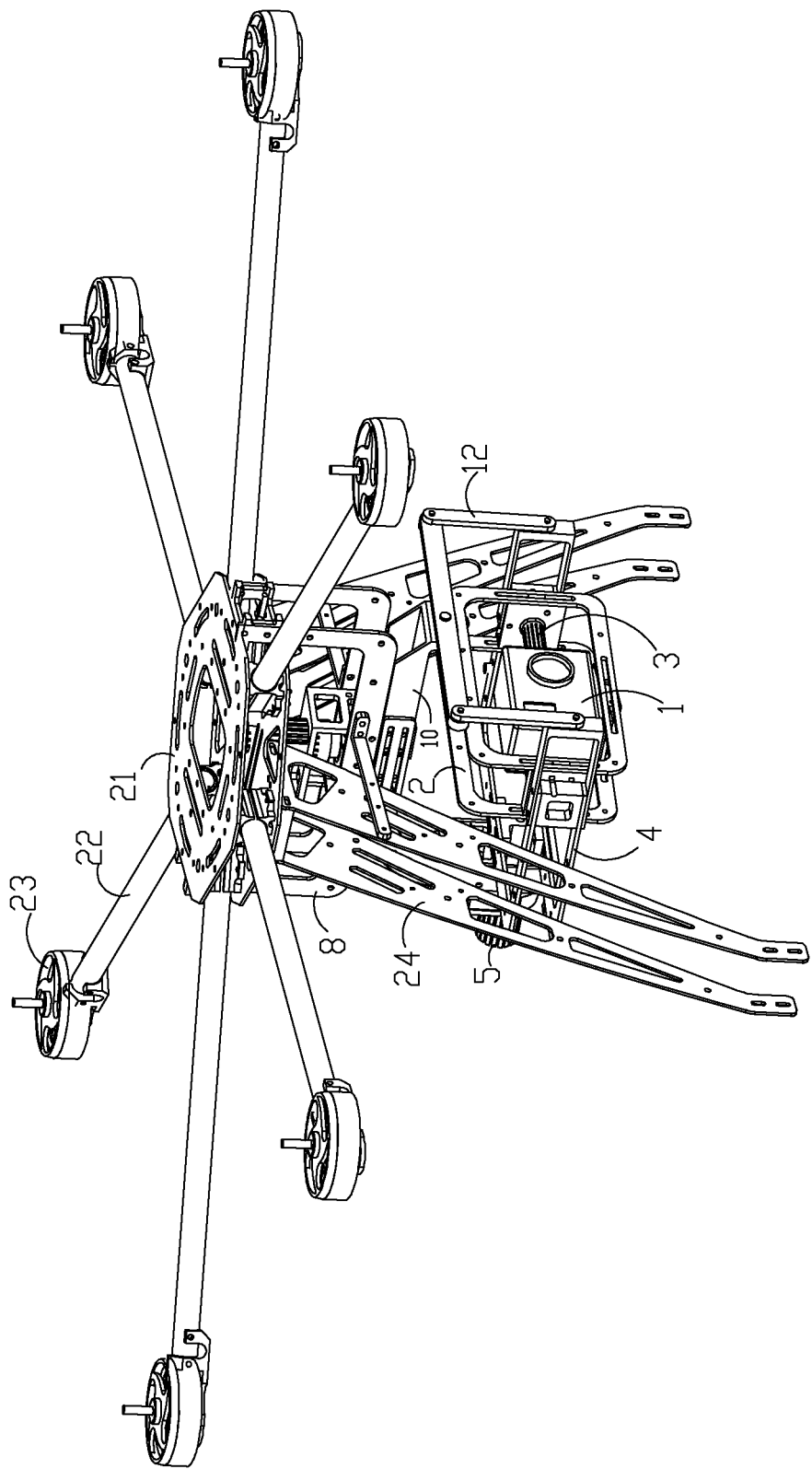
FIG. 11 illustrates another view of the assembled unmanned multi-rotor aircraft of FIG. 8 carrying a stabilizing platform with a payload device, in accordance with an embodiment of the present invention.
Figure 12:
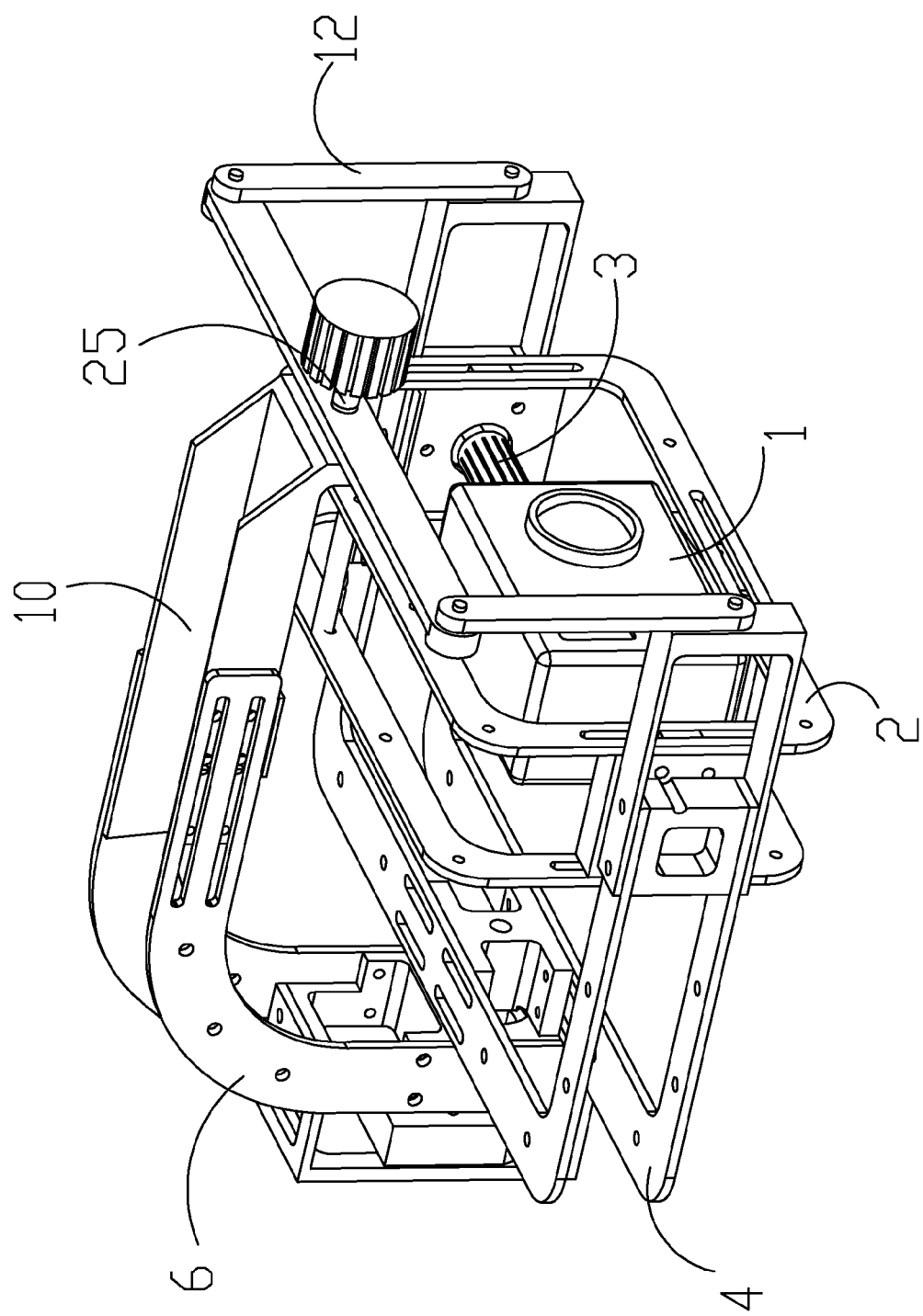
FIG. 12 illustrates a view of an assembled two-axis stabilizing platform with a payload device, in accordance with an embodiment of the present invention. Unlike FIGS. 1-6, instead of the second motor 5 directly driving the second frame member 4, the fastener 13 is replaced with a fourth motor 25 which directly drives the connecting assembly 12 to rotate, thereby causing the second frame member 4 to rotate relative to the third frame member 6. The connecting assembly 12 and the second frame member 4 form a parallelogram structure and rotate at the same angle, so that the rotation trajectory of the second frame member 4 is not affected. Meanwhile, the connecting assembly 12 provides effective support for the two open ends of the second frame member 4 along the vertical direction, increasing the load capacity and rigidity of the second frame member 4, reducing the deformation and weight thereof.
Figure 13:
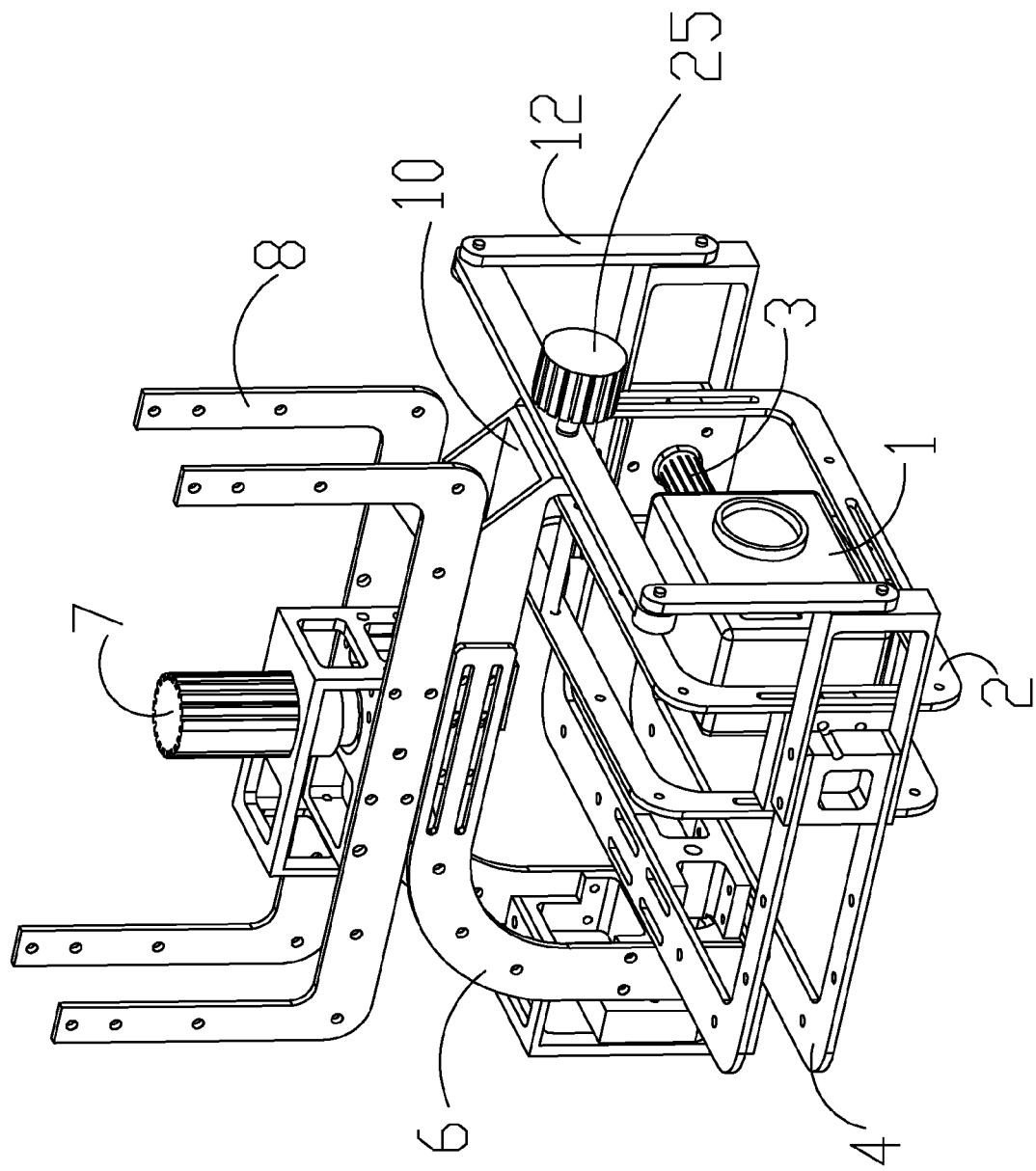
FIG. 13 illustrates a view of an assembled three-axis stabilizing platform with a payload device, in accordance with an embodiment of the present invention. Unlike the two-axis stabilizing platform shown in FIG. 12, the frame assembly of the illustrated stabilizing platform further includes a mounting frame member 8, and the motor assembly further includes the third motor 7 which directly drives the third frame member 6 to rotate relative to the mounting frame member 8. To achieve circumferential rotation of the payload device 1 in order to perform panoramic photography within a 360 degree range, the mounting frame member 8 is mounted to a helicopter or a multi-rotor aircraft. The third frame member 6 can rotate relative to the mounting frame member 8 around the Z axis.
Figure 14:
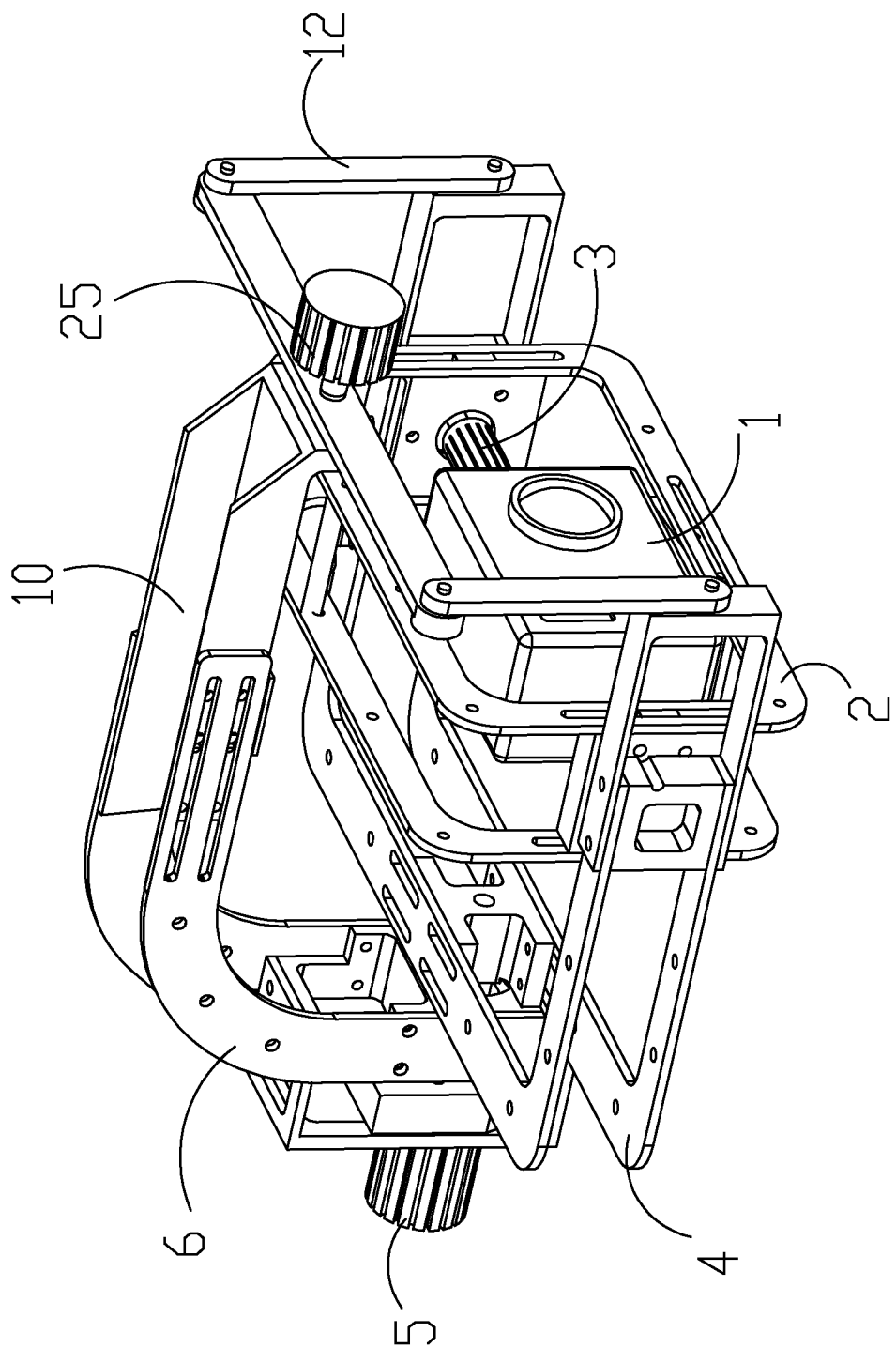
FIG. 14 illustrates a view of an assembled two-axis stabilizing platform with a payload device, in accordance with an embodiment of the present invention. Unlike the stabilizing platform shown in FIG. 12, the motor assembly of the illustrated stabilizing platform further includes the second motor 5, which directly drive the second frame member 4 to rotate relative to the third frame member 6. The second motor 5 can an auxiliary actuator and, in conjunction with the fourth motor 25, drive the second frame member 4 to rotate. Since the connecting assembly 12 and the second frame member 4 form a parallelogram structure, the second motor and the fourth motor can be used together to drive the rotation of the second frame member 4. It is appreciated that the second motor 5 and the fourth motor 25 can also independently drive the rotation of the second frame member 4.
Figure 15:
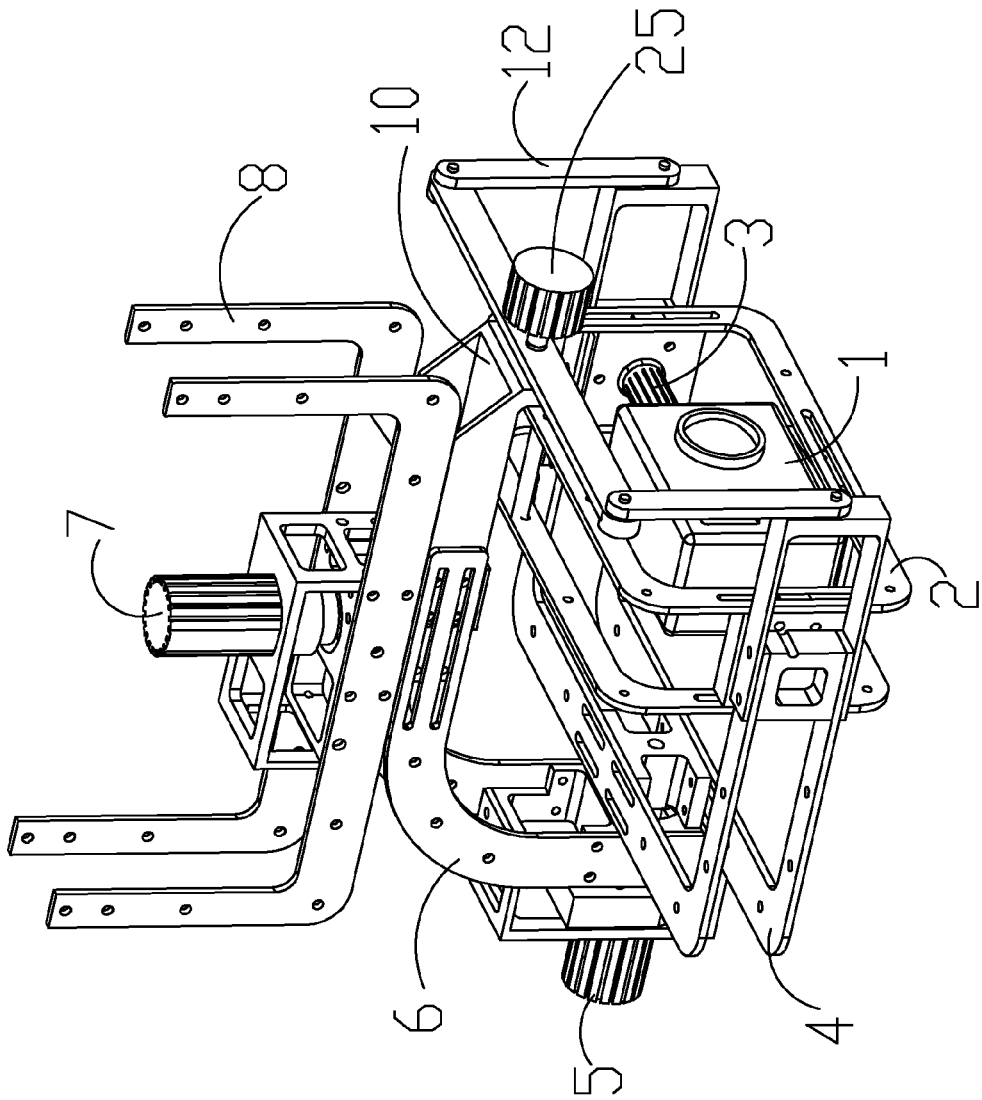
FIG. 15 illustrates a view of an assembled three-axis stabilizing platform with a payload device, in accordance with an embodiment of the present invention. Unlike the stabilizing platform shown in FIG. 14, the frame assembly of the illustrated stabilizing platform further includes a mounting frame member 8, and the motor assembly further includes the third motor 7 which directly drives the third frame member 6 to rotate relative to the mounting frame member 8. To achieve circumferential rotation of the payload device 1 in order to perform panoramic photography within a 360 degree range, the mounting frame member 8 is mounted to a helicopter or a multi-rotor aircraft. The third frame member 6 can rotate relative to the mounting frame member 8 around the Z axis.
Figure 16:
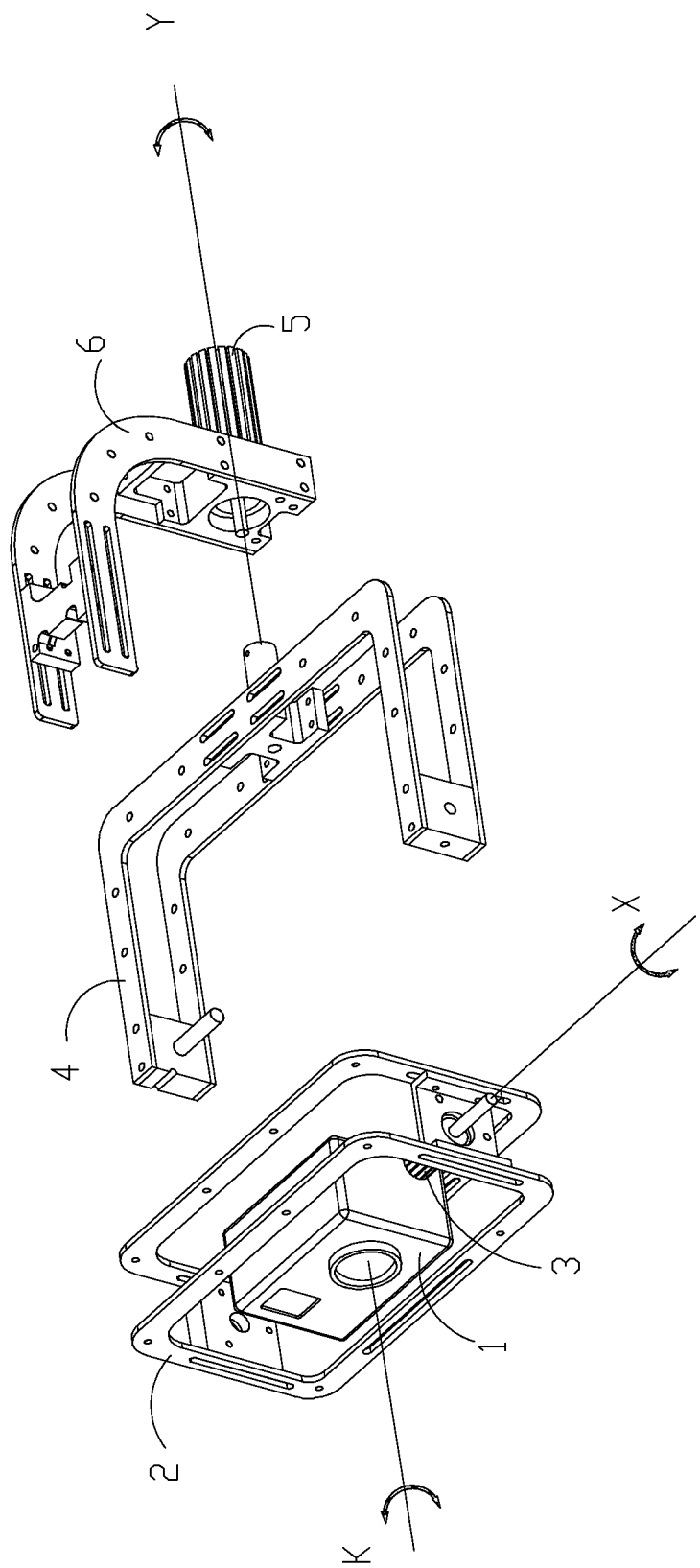
FIG. 16 illustrates an exploded view of a two-axis stabilizing platform with a payload device, in accordance with an embodiment of the present invention. When the axis K of the lens of the payload device 1 becomes perpendicular to the plane formed by the X axis and Y axis, the rotation of the second frame member 4 can only drive the lens of the payload device 1 to scan within a given range around in the orthogonal plane and not the rotation of the lens itself. In order to achieve full adjustment of the angle of the lens of the payload device 1 even when the axis of the lens is rotated to be perpendicular to the plane formed by the X axis and Y axis, the motor assembly includes an additional motor for directly driving the payload device 1 to rotate around the K axis. When the K axis is parallel or coaxial with the Y axis, the rotation of the second frame member 4 can be used to achieve the rotation of the lens of the payload device 1. When the K axis is perpendicular to the Y axis, the rotation of the lens of the payload device 1 can be achieved using the additional motor.
Figure 17:
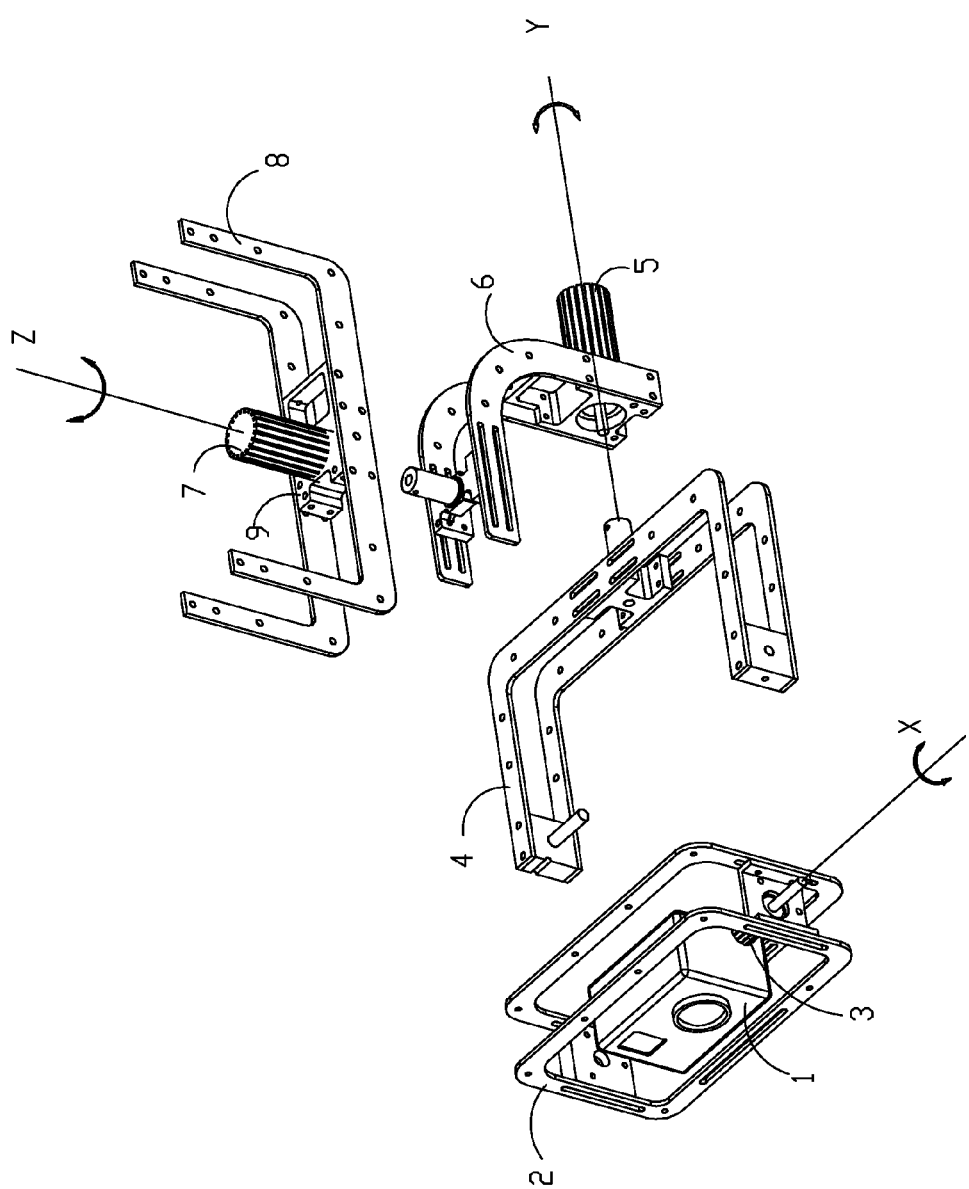
FIG. 17 illustrates an exploded view of a stabilizing platform with a payload device, in accordance with an embodiment of the present invention. When the axis K of the lens of the payload device 1 becomes perpendicular to the plane formed by the X axis and Y axis, the rotation of the second frame member 4 can only drive the lens of the payload device 1 to scan within a given range around in the orthogonal plane and not the rotation of the lens itself. In order to achieve full adjustment of the angle of the lens of the payload device 1 even when the axis of the lens is rotated to be perpendicular to the plane formed by the X axis and Y axis, the motor assembly includes an additional motor for directly driving the payload device 1 to rotate around the K axis. When the K axis is parallel or coaxial with the Y axis, the rotation of the second frame member 4 can be used to achieve the rotation of the lens of the payload device 1. When the K axis is perpendicular to the Y axis, the rotation of the lens of the payload device 1 can be achieved using the additional motor.
Figure 18:
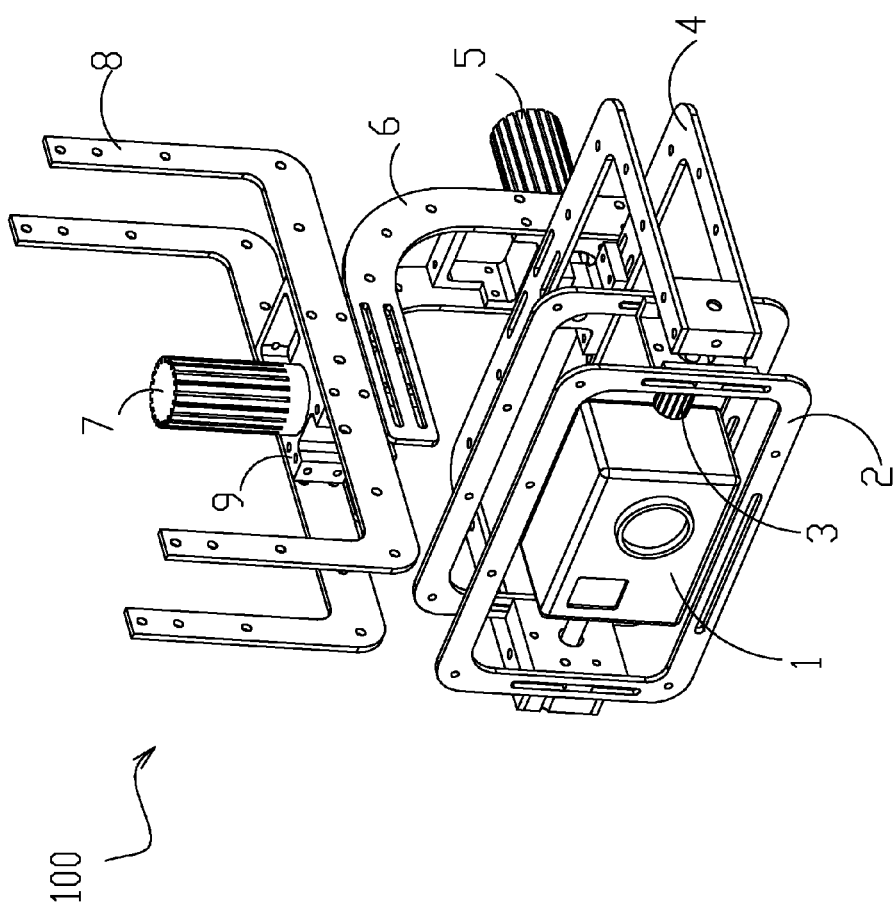
FIG. 18 illustrates a view of an assembled stabilizing platform with a payload device, in accordance with an embodiment of the present invention.
Figure 19:
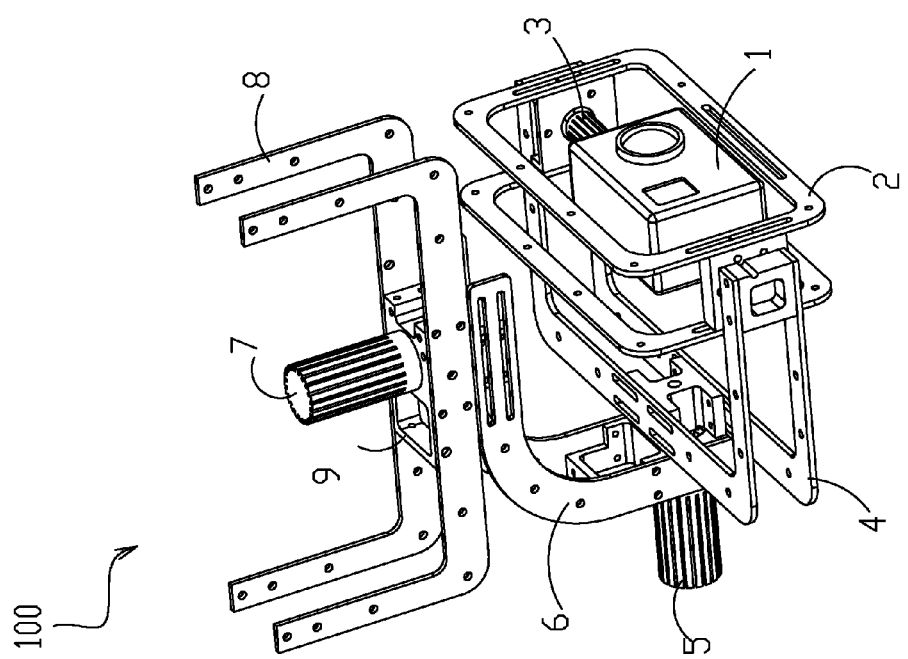
FIG. 19 illustrates another view of the assembled stabilizing platform with a payload device shown in FIG. 18, in accordance with an embodiment of the present invention.
Figure 20:
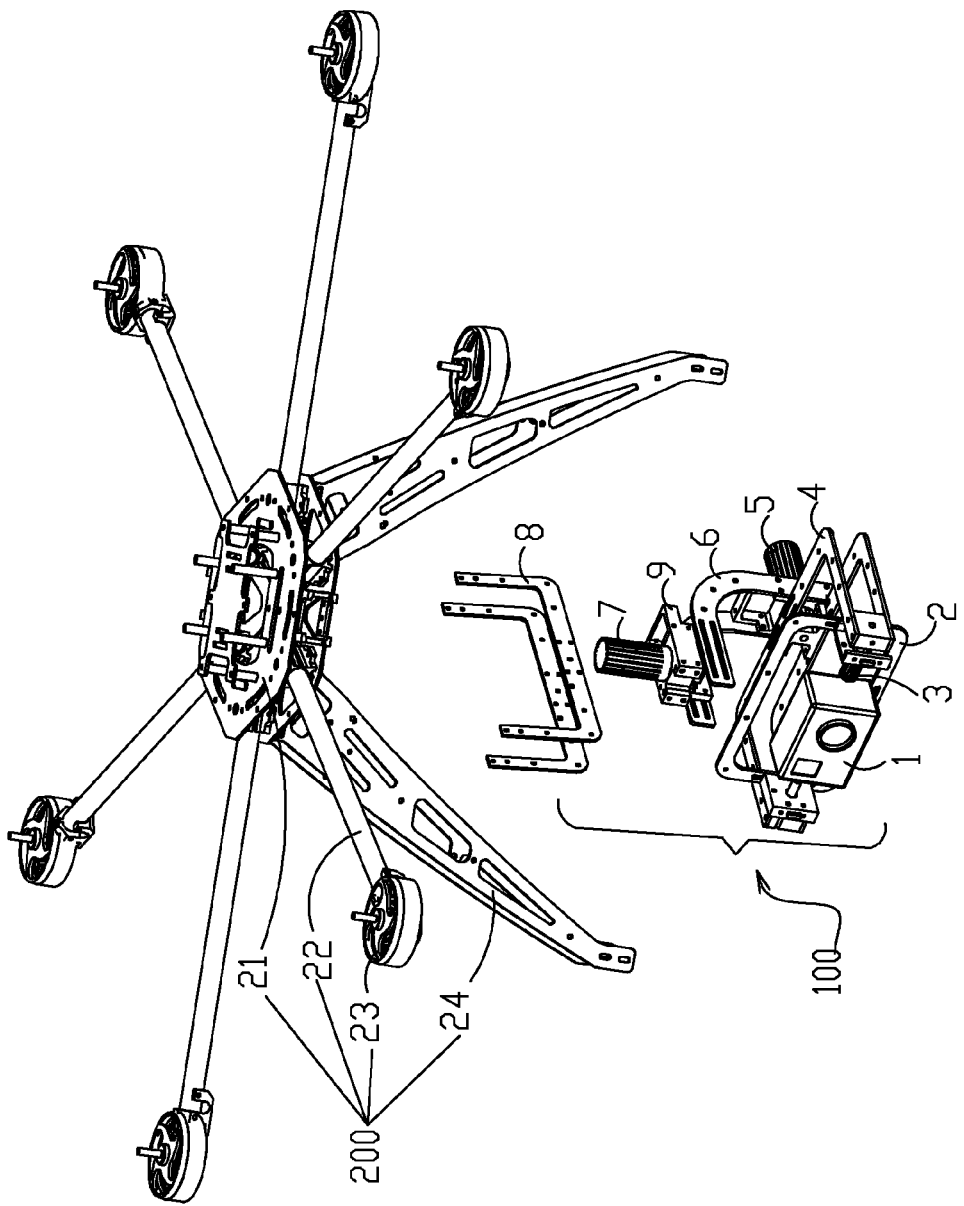
FIG. 20 illustrates an exploded view of a multi-rotor aircraft carrying a three-axis stabilizing platform with a payload device, in accordance with an embodiment of the present invention. The multi-rotor aircraft may include four, six, eight, or any suitable number of rotors. The stabilizing platform can include a two-axis stabilizing platform such as discussed in connection with the exemplary embodiment 1, or a three-axis stabilizing platform such as discussed in connection with the exemplary embodiment 2. As illustrated, the UAV can include a multi-rotor mount 200, IMU module, GPS, and other components. The multi-rotor mount 200 can include a base 21, multiple equispaced support arms 22 connected to the base 21, and rotor members 23 disposed on the support arms 22. The support arms 22 can be connected to the base 21 via plugging mechanism, welding, screws, riveting, and the like. The positioning bracket 9 can be coupled to the mounting frame member 8, for example, via screws. The stator of the third motor 7 can be disposed on the positioning bracket 9. It is appreciated that, in various embodiments, the positions of the stator and rotor of the third motor 7 can be interchangeable.
Figure 21:
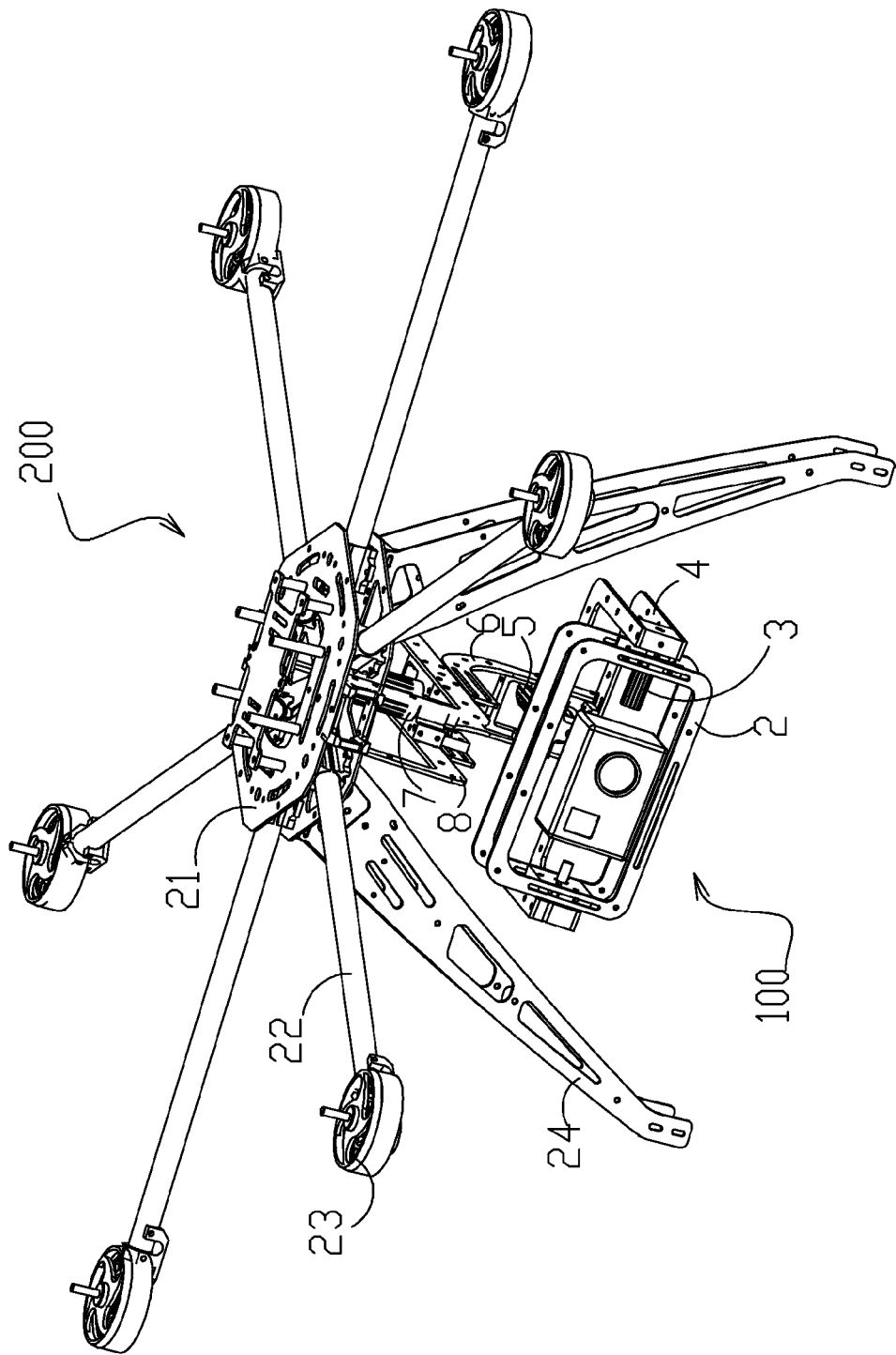
FIG. 21 illustrates a view of a multi-rotor aircraft carrying a three-axis stabilizing platform with a payload device, in accordance with an embodiment of the present invention.
Figure 22:
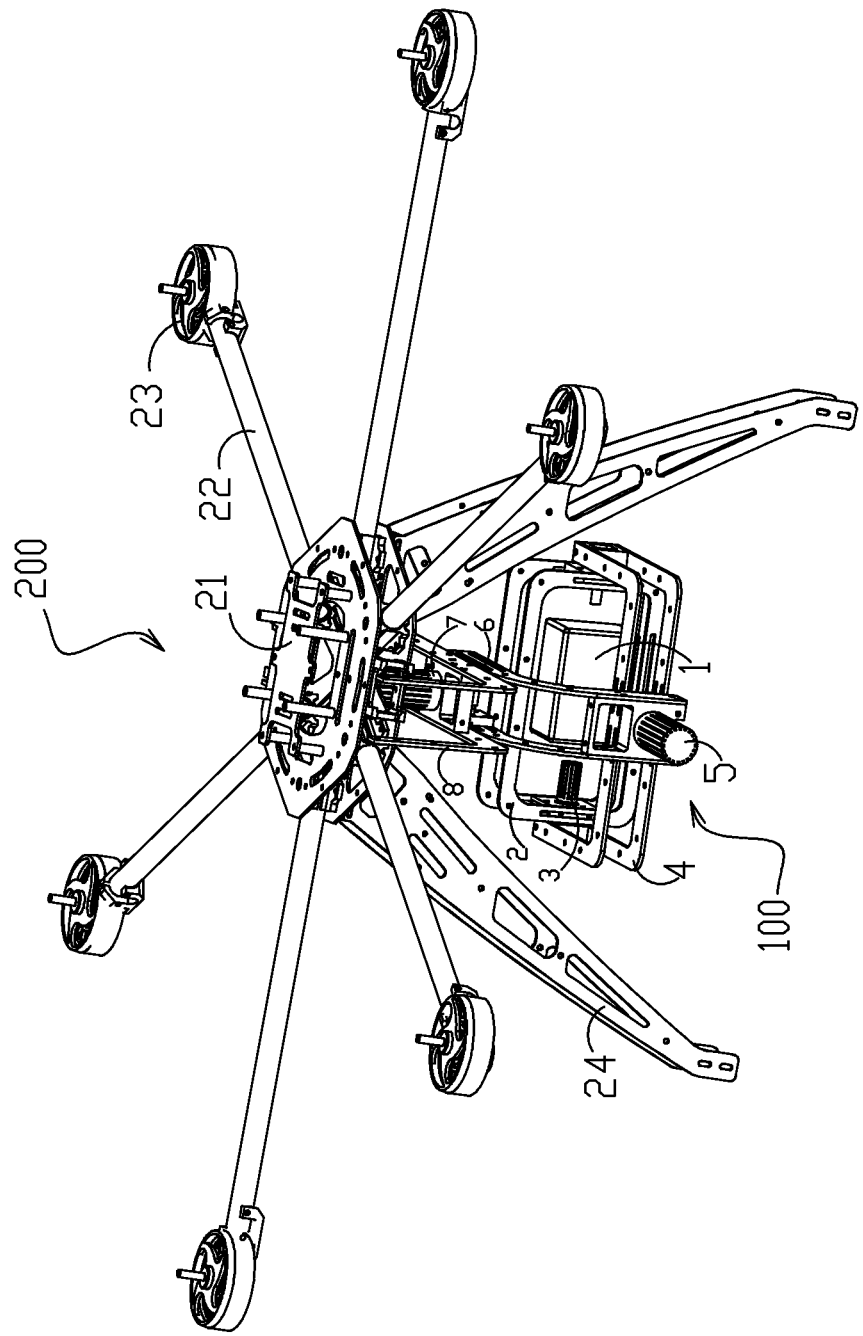
FIG. 22 illustrates another view of a multi-rotor aircraft carrying a three-axis stabilizing platform with a payload device, in accordance with an embodiment of the present invention.
Figure 23:
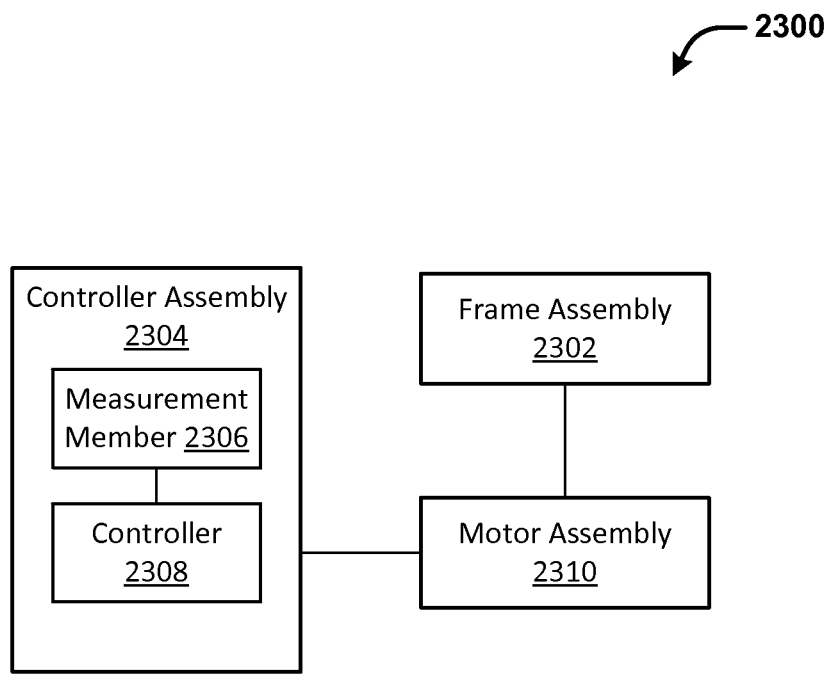
FIG. 23 illustrates exemplary components of a stabilizing platform 2300, in accordance with an embodiment of the present invention.

In various embodiments, the stabilizing platform discussed herein may be mounted or otherwise coupled to a movable object such as those described herein. FIG. 7 illustrates a structural schematic view of an unmanned aerial vehicle (UAV) 702 carrying a stabilizing platform 704 with a payload device 706, in accordance with an embodiment of the present invention. The stabilizing platform 704 may be similar to the two-axis stabilizing platform discussed in connection with FIG. 1 or the three-axis stabilizing platform discussed in connection with FIG. 2-6. The payload device 706 may include an imaging device (camera) or non-imaging device such as discussed above. The stabilizing platform is mounted to the base of the UAV.

During operation, the UAV may be remotely controlled to approach a target object the images of which are to be acquired. Subsequently, the stabilizing platform may be controlled, for example, by the controller assembly and/or a remote control, to stabilize the payload device so as to improve the quality of images captured by the device. For example, the measurement member of the stabilizing platform may calculate posture information of the payload device and/or the UAV and provide motor signals to the motor assembly for directly drive the rotation of the frame assembly to 1) stabilize the payload device with respect to the target object; and/or 2) maintain the payload device at a predetermined posture with respect to the target object.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. An apparatus, comprising:
   (a) a frame assembly adapted to hold a device, wherein the frame assembly comprises:
      a first frame member configured to be coupled to the device;
      a second frame member rotatably coupled to the first frame member on a pitch axis of the device; and
      a third frame member rotatably coupled to the second frame member on a roll axis of the device that intersects with the device
   (b) a controller assembly comprising:
      an inertial measurement member configured to obtain state information comprising at least angular velocity and linear acceleration of the device;
      a controller configured to provide one or more motor signals based at least in part on posture information calculated from the state information; and
   (c) a motor assembly configured to directly drive the frame assembly in response to the one or more motor signals so as to allow the device to rotate around at least one of the pitch, roll or yaw axes; and wherein
   the apparatus further comprises a connecting assembly that connects a distal end of the second frame member and a distal end of the third frame member so as to support and stabilize the second frame member when the second frame member rotates relative to the third frame member,
   wherein the connecting assembly comprises a first connecting member, a second connecting member, and a third connecting member, which are sequentially and hingedly connected;
   a free end of the first connecting member is hingedly connected with a first distal end of the second frame member;
   a free end of the third connecting member is hingedly connected with a second distal end of the second frame member; and
   the second connecting member is connected with the third frame member, and
   wherein the motor assembly comprises a fourth motor configured to directly drive the second connecting member to rotate relative to the third frame member.

2. The apparatus of claim 1, wherein the motor assembly comprises:
   a first motor configured to directly drive the first frame member to rotate around the pitch axis in response to at least one of the one or more motor signals; and
   a second motor configured to directly drive the second frame member to rotate around the roll axis in response to at least one of the one or more motor signals.

3. The apparatus of claim 2, wherein the frame assembly further comprises a fourth frame member, the fourth frame member rotatably coupled to the third frame member on a yaw axis of the device.

4. The apparatus of claim 3, wherein the motor assembly further comprises a third motor configured to directly drive the third frame member to rotate around the yaw axis in response to at least one of the one or more motor signals.

5. The apparatus of claim 1, wherein the frame assembly further comprises an adjustment member for adjusting at least one of the pitch, roll, or yaw axis relative to the frame assembly.

6. An unmanned aerial vehicle (UAV), comprising a base coupled to the apparatus of claim 1.

7. A method for controlling the apparatus of claim 1, comprising:
- calculating, by the controller assembly, posture information based at least in part on the state information;
- providing, by the controller assembly, one or more motor signals to the motor assembly based at least in part on the calculated posture information; and
- in response to the one or more motor signals, driving, by the motor assembly, the frame assembly to rotate around at least one of the pitch, roll, or yaw axis;
- wherein said driving, by the motor assembly, further comprises driving the fourth motor to directly drive the second connecting member to rotate relative to the third frame member.

8. A method of image acquisition, comprising:
- remotely operating the unmanned aerial vehicle (UAV) to approach an object, the UAV being coupled to the apparatus of claim 1; and
- controlling the apparatus to stabilize a device held by the frame assembly of the apparatus so as to improve quality of images captured by the device.

9. The apparatus of claim 1, wherein the motor assembly comprises:
- a first motor configured to directly drive the first frame member to rotate around the pitch axis in response to at least one of the one or more motor signals;
- a second motor configured to directly drive the second frame member to rotate around the roll axis in response to at least one of the one or more motor signals; and wherein
- a stator of the first motor is affixed to the first frame member and a rotor of the first motor is affixed to the second frame member, or the rotor of the first motor is affixed to the first frame member and the stator of the first motor is affixed to the second frame member; and
- a stator of the second motor is affixed to the second frame member and a rotor of the second motor is affixed to the third frame member, or the rotor of the second motor is affixed to the second frame member and the stator of the second motor is affixed to the third frame member.

10. The apparatus of claim 1, wherein the device is configured to capture images.

11. The apparatus of claim 2, wherein the center of gravity of (i) the device and (ii) the first frame member, is located on the pitch axis.

12. The apparatus of claim 2, wherein the center of gravity of (i) the device, (ii) the first frame member, and (iii) the second frame member, is located on the roll axis.

13. The apparatus of claim 2, wherein the center of gravity of (i) the device, (ii) the first frame member, (iii) the second frame member, and (iv) the third frame member, is located on the yaw axis.

* * * * *